(12) United States Patent
Biasini et al.

(10) Patent No.: US 10,855,894 B2
(45) Date of Patent: Dec. 1, 2020

(54) MOBILE DEVICE CASE AND TECHNIQUES FOR MULTI-VIEW IMAGING

(71) Applicant: Scandit AG, Zurich (CH)

(72) Inventors: Marco Valentino Biasini, Lucerne (CH); Christian Floerkemeier, Zürich (CH); Thomas Wesner, Zürich (CH)

(73) Assignee: SCANDIT AG, Zurich (CH)

(*) Notice: Subject to any disclaimer, the term of this patent is extended or adjusted under 35 U.S.C. 154(b) by 0 days.

(21) Appl. No.: 16/917,322

(22) Filed: Jun. 30, 2020

(65) Prior Publication Data
US 2020/0336631 A1 Oct. 22, 2020

Related U.S. Application Data

(63) Continuation of application No. PCT/IB2019/000049, filed on Jan. 8, 2019.
(Continued)

(51) Int. Cl.
*H04N 5/225* (2006.01)
*H04N 5/232* (2006.01)
*H04N 5/235* (2006.01)

(52) U.S. Cl.
CPC ......... *H04N 5/2254* (2013.01); *H04N 5/2259* (2013.01); *H04N 5/2353* (2013.01); *H04N 5/23216* (2013.01); *H04N 5/23238* (2013.01)

(58) Field of Classification Search
None
See application file for complete search history.

(56) References Cited

U.S. PATENT DOCUMENTS

| 4,167,756 A | 9/1979 | Smith et al. |
| D344,261 S | 2/1994 | Watanabe |
| (Continued) | | |

FOREIGN PATENT DOCUMENTS

| EP | 3167404 A1 | 5/2017 |
| JP | 2004-032507 A | 1/2009 |
| (Continued) | | |

OTHER PUBLICATIONS

International Search Report and Written Opinion for International Application No. PCT/US2012/043184 dated Feb. 27, 2013.
(Continued)

*Primary Examiner* — Mark T Monk
(74) *Attorney, Agent, or Firm* — Wolf, Greenfield & Sacks, P.C.

(57) ABSTRACT

Described herein are embodiments of a mobile device case that allows a mobile device camera to view and/or capture images from multiple fields of view. The case may allow the mobile device camera to simultaneously capture image information from multiple different directions relative to the camera or mobile device. The fields of view may not be contiguous fields of view, such that there is a gap or other discontinuity between the fields of view. One field of view may be a field visible from or facing a surface of the mobile device on which the camera is disposed (e.g., the back of the mobile device) and another field of view may be one visible from or facing a different surface of the mobile device. Also described are embodiments of techniques for configuring a mobile device to capture and/or process images from multiple fields of view.

19 Claims, 23 Drawing Sheets

Related U.S. Application Data

(60) Provisional application No. 62/614,814, filed on Jan. 8, 2018.

(56) References Cited

U.S. PATENT DOCUMENTS

| | | | |
|---|---|---|---|
| 5,744,815 A | 4/1998 | Gurevich et al. | |
| D473,872 S | 4/2003 | Ausems et al. | |
| 6,580,453 B1 | 6/2003 | Hirasawa | |
| 6,816,156 B2 * | 11/2004 | Sukeno | G09G 5/10 |
| | | | 345/204 |
| D576,197 S | 9/2008 | Takagi | |
| 7,457,407 B2 | 11/2008 | Sun et al. | |
| D654,931 S | 2/2012 | Lemelman et al. | |
| D658,174 S | 4/2012 | Tasselli et al. | |
| D659,564 S | 5/2012 | Baxter | |
| 8,223,203 B2 | 7/2012 | Ohsumi et al. | |
| D667,823 S | 9/2012 | Merenda | |
| D670,278 S | 11/2012 | Hamann | |
| D672,386 S | 12/2012 | Matunuma et al. | |
| D678,870 S | 3/2013 | Fathollahi | |
| D678,936 S | 3/2013 | Oliver | |
| D685,360 S | 7/2013 | Chen et al. | |
| D688,654 S | 8/2013 | Stevinson | |
| D698,772 S | 2/2014 | Merenda | |
| D710,343 S | 8/2014 | Chandler, Jr. et al. | |
| D710,346 S | 8/2014 | Smith et al. | |
| 8,798,453 B2 | 8/2014 | Lawton | |
| D716,285 S | 10/2014 | Chaney et al. | |
| D716,785 S | 11/2014 | White | |
| D717,287 S | 11/2014 | Macrina et al. | |
| D717,304 S | 11/2014 | Yturralde et al. | |
| D719,166 S | 12/2014 | Brown et al. | |
| D719,167 S | 12/2014 | Brown et al. | |
| D724,573 S | 3/2015 | Stevinson | |
| D726,701 S | 4/2015 | Stevinson | |
| 9,019,420 B2 | 4/2015 | Hurst et al. | |
| D728,551 S | 5/2015 | Saeki et al. | |
| D732,011 S | 6/2015 | Stevinson | |
| D733,112 S | 6/2015 | Chaney et al. | |
| D734,336 S | 7/2015 | Mistkawi et al. | |
| D744,470 S | 12/2015 | Stevinson | |
| D748,085 S | 1/2016 | Merenda | |
| D754,114 S | 4/2016 | Curtis et al. | |
| D754,650 S | 4/2016 | Curtis et al. | |
| D759,004 S | 6/2016 | Stevinson | |
| D760,209 S | 6/2016 | Weng et al. | |
| D760,212 S | 6/2016 | Mao et al. | |
| D760,710 S | 7/2016 | Ozolins et al. | |
| D761,240 S | 7/2016 | Ozolins et al. | |
| D768,617 S | 10/2016 | Merenda | |
| D771,631 S | 11/2016 | Fitch et al. | |
| 9,654,675 B2 | 5/2017 | Kessler | |
| 10,191,242 B2 | 1/2019 | Palmeri | |
| D860,180 S | 9/2019 | Lehmann et al. | |
| D862,441 S | 10/2019 | Eppler et al. | |
| 2007/0116454 A1 | 5/2007 | Tsai | |
| 2009/0002797 A1 | 1/2009 | Kwong et al. | |
| 2010/0102129 A1 | 4/2010 | Drzymala et al. | |
| 2010/0328420 A1 | 12/2010 | Roman | |
| 2011/0007205 A1 | 1/2011 | Lee | |
| 2011/0043683 A1 | 2/2011 | Beach et al. | |
| 2011/0081946 A1 | 4/2011 | Singh | |
| 2013/0329115 A1 | 12/2013 | Palmeri | |
| 2014/0171150 A1 | 6/2014 | Hurst et al. | |
| 2014/0232930 A1 | 8/2014 | Anderson | |
| 2014/0285913 A1 | 9/2014 | Palmeri | |
| 2014/0327815 A1 | 11/2014 | Auger | |
| 2015/0053765 A1 | 2/2015 | Powell et al. | |
| 2015/0220766 A1 | 8/2015 | Russell et al. | |
| 2016/0077307 A1 | 3/2016 | Palmeri | |

FOREIGN PATENT DOCUMENTS

| | | |
|---|---|---|
| KR | 1020020077090 A | 10/2002 |
| KR | 1020060102957 A | 9/2006 |
| WO | WO 01/31893 A1 | 5/2001 |
| WO | WO 2016/007662 A1 | 1/2016 |

OTHER PUBLICATIONS

International Search Report and Written Opinion for International Application No. PCT/IB2019/000049 dated Aug. 1, 2019.

Invitation to Pay Additional Fees for International Application No. PCT/IB2019/000049 dated Jun. 11, 2019.

[No Author Listed] Code ReaderTM 4405. Available at: http://www.codecorp.com/products.php?id=167. Dec. 4, 2015. 1 page.

[No Author Listed] Linea Pro Extreme Rugged Case. Available at: http://ipcprint.com/linea-pro-extreme-rugged-case.html. Dec. 4, 2015. 2 pages.

[No Author Listed] Mobile Imager. Available at: http://padloc.co/pages/mobile-imager. Dec. 4, 2015. 2 pages.

\* cited by examiner

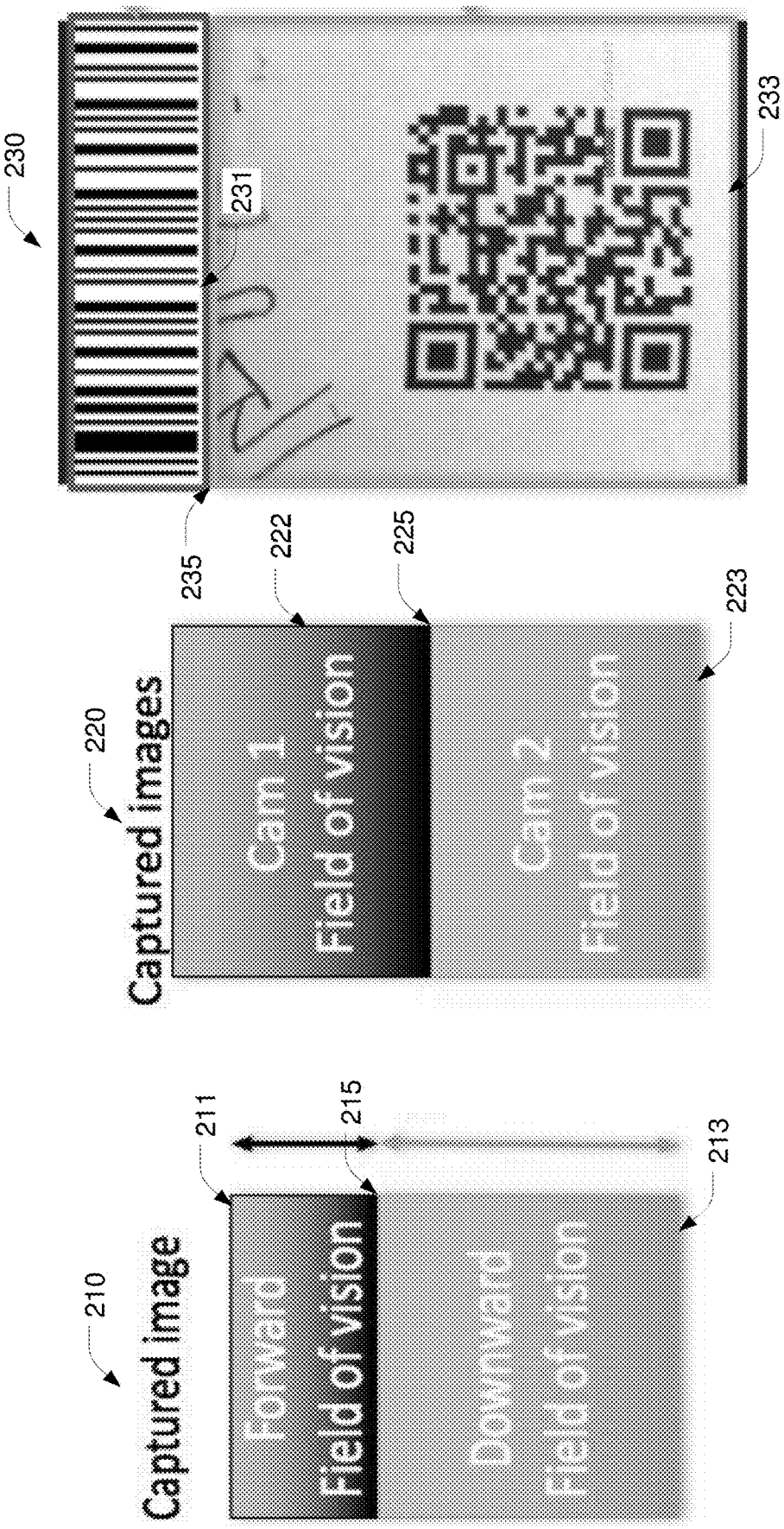

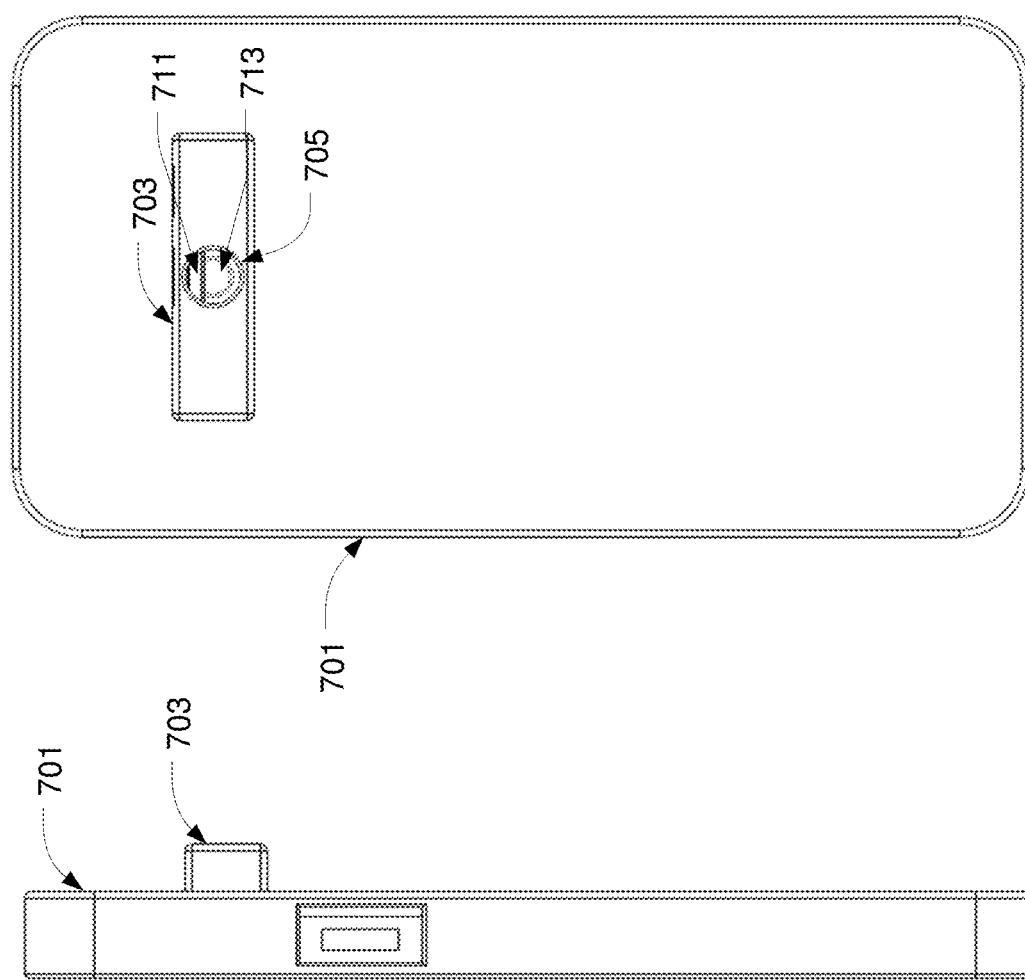
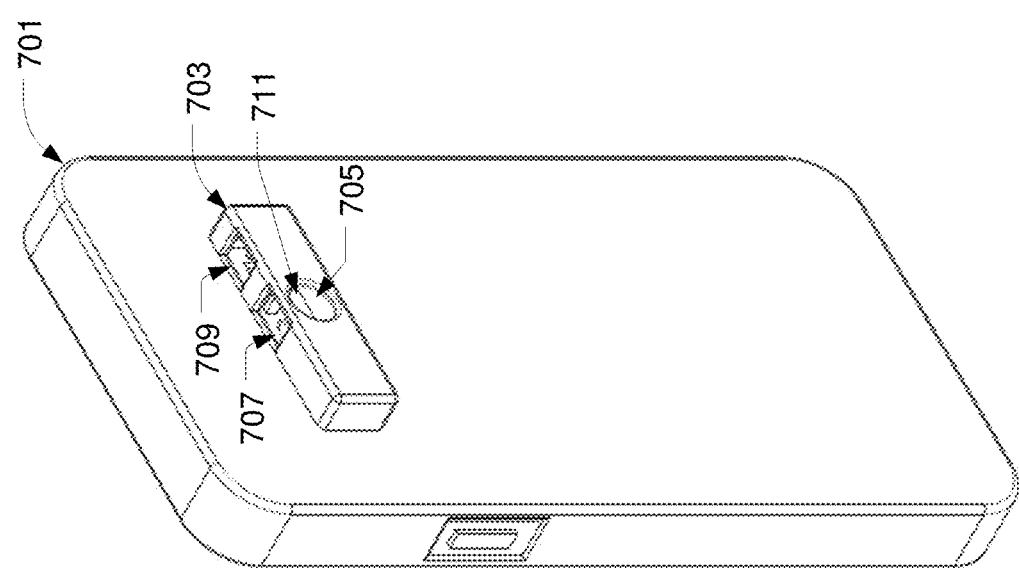
FIG. 7C
FIG. 7B
FIG. 7A

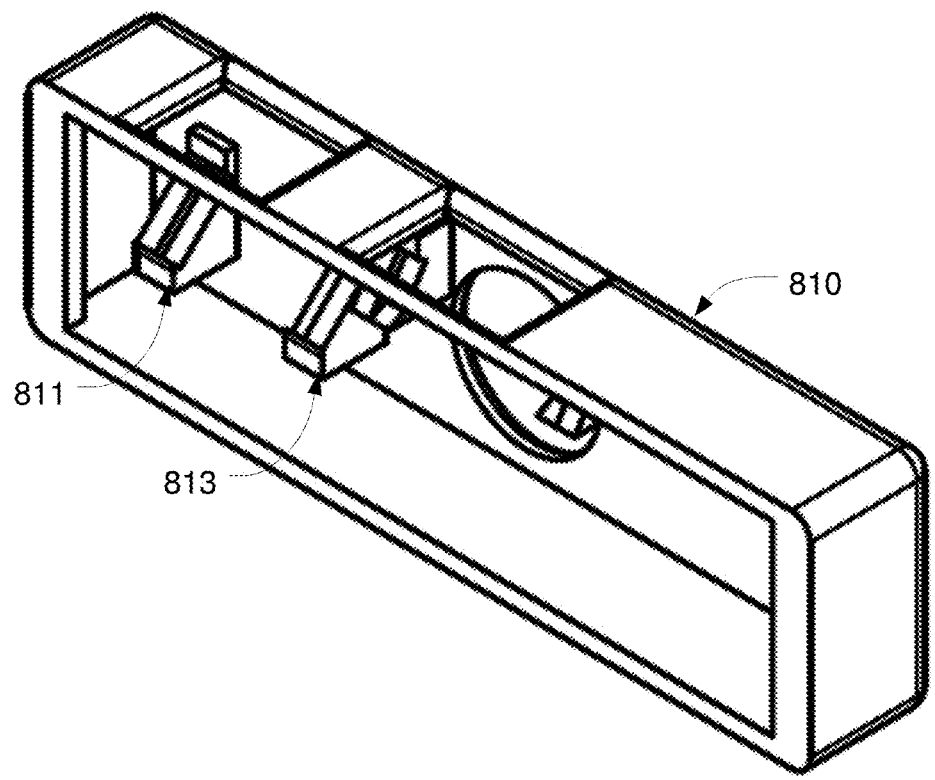
FIG. 8A
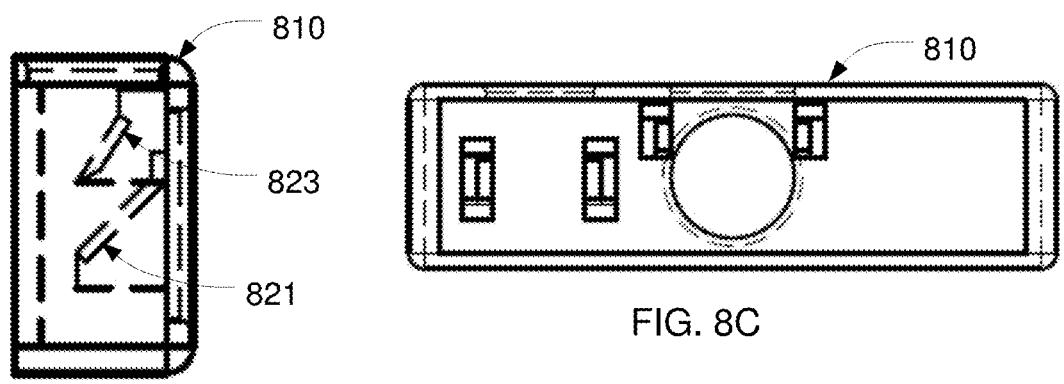
FIG. 8B
FIG. 8C

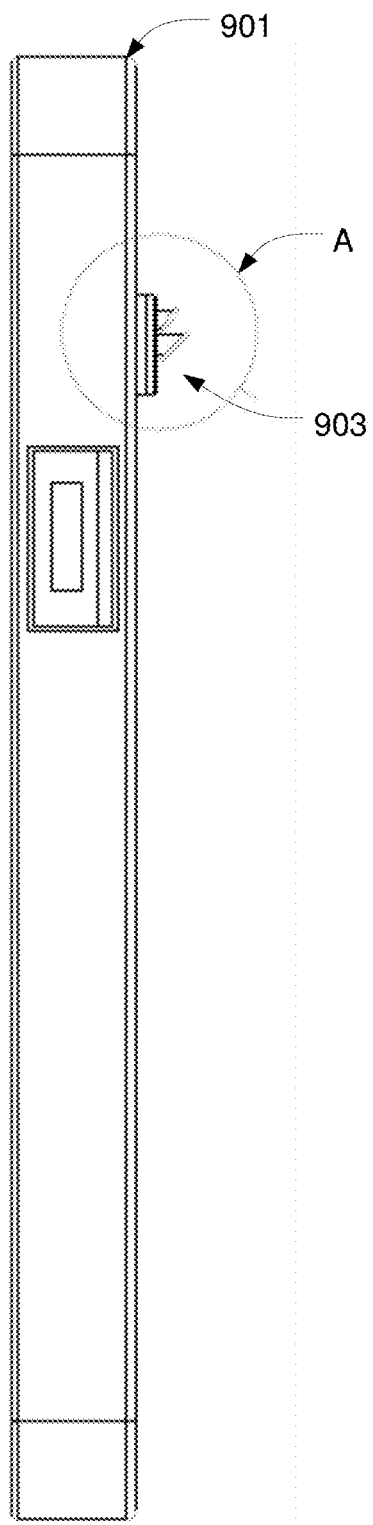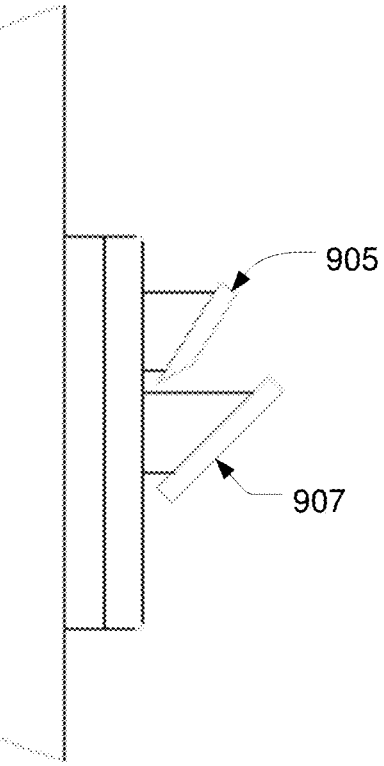
FIG. 9A
FIG. 9B

MOBILE DEVICE CASE AND TECHNIQUES FOR MULTI-VIEW IMAGING

RELATED APPLICATIONS

This application claims the benefit under 35 U.S.C. § 102 as a continuation of PCT Application No. PCT/IB2019/000049 filed Jan. 8, 2019, which claims the benefit of U.S. Provisional Patent Application No. 62/614,814, filed Jan. 8, 2018, each of which is herein incorporated by reference in its entirety.

TECHNICAL FIELD

Some embodiments of the disclosed technology pertain to apparatuses and techniques for bar code scanning with mobile devices. More particularly, in some embodiments, a mobile device case is provided having optical element(s) that enable the mobile device to simultaneous view multiple fields of view. For example, the mobile device case can allow a mobile device camera to view an image from a back of the mobile device and a top of the mobile device. Some embodiments provide techniques for processing images viewed by a camera of a mobile device that include more than one field of view to identify a division between fields of view. Some embodiments provide techniques for setting image capture parameters (e.g., exposure and/or focus settings) differently for the different fields of view that can be viewed simultaneously by the camera.

BACKGROUND

A bar code may be an optical representation of data that can be read by a machine. The bar code can describe something about an object or a product, such as an object or product labeled with the bar code.

A bar code may be made up of a pattern of geometric shapes and spaces. For example, a "1D" bar code like a Universal Product Code (UPC) may include a collection of lines of varying width and space, and a "2D" bar code like a Quick Response (QR) Code may include a collection of squares of different shapes, sizes, and contents. Data may be embedded in the patterns that make up a bar code, such that the patterns can represent numbers, text, or other information, such as information about an object or a product.

Special optical scanners and/or machines are often used to read bar codes. By scanning bar codes with a machine or other device, businesses and organizations can track products, prices, inventory, and other information about a large number of products. Scanning of a bar code can allow information about products to automatically be entered into a computer system.

BRIEF SUMMARY

In one embodiment, a case for a mobile device having a camera is provided. The case comprises: a housing having a shape fitted at least in part to a shape of at least a portion of an exterior of the mobile device and arranged to receive and hold the at least the portion of the mobile device, the housing comprising: a back surface, the back surface corresponding to a surface of the mobile device on which the camera is disposed; at least one top surface; a first opening on the back surface; a second opening on at least a first one of the at least one top surface; and at least one optical element; wherein the housing is arranged such that when at least the portion of the mobile electronic device is disposed in the housing at least a first one of the at least one optical element conveys light between the second opening and the camera.

In another embodiment, there is provided a mobile device. The mobile device comprises at least one sensor, the at least one sensor including a camera; at least one processor; and at least one storage medium having encoded thereon executable instructions that, when executed by the at least one processor, cause the at least one processor to carry out a method. The method comprises determining, based on at least one input from the at least one sensor, whether the mobile device is disposed inside a case having at least one optical element, the at least one optical element allowing the camera to view multiple fields of view; and in response to determining that the mobile device is disposed inside the case having the at least one optical element: configuring the mobile device to analyze image data for presence of a bar code in one or multiple fields of view captured by the camera.

In another embodiment, there is provided a mobile device. The mobile device comprises at least one sensor, the at least one sensor including a camera; at least one processor; and at least one storage medium having encoded thereon executable instructions that, when executed by the at least one processor, cause the at least one processor to carry out a method. The method comprises determining, based on at least one input from the at least one sensor, whether the mobile device is disposed inside a case; and in response to determining that the mobile device is disposed inside the case: configuring the mobile device to perform one or more functions associated with the case.

In another embodiment, there is provided a mobile device. The mobile device comprises a camera; at least one processor; and at least one storage medium having encoded thereon executable instructions that, when executed by the at least one processor, cause the at least one processor to carry out a method. The method comprises determining, from an analysis of one or more images captured by the camera, that the one or more images include image data corresponding to both a first field of view of the camera and a second field of view of the camera, the first field of view being noncontiguous with the second field of view; and analyzing the one or more images to identify, in the one or more images, a location of a boundary between image data for the first field of view and image data for the second field of view.

In another embodiment, there is provided a mobile device. The mobile device comprises a camera; a display; at least one processor; and at least one storage medium having encoded thereon executable instructions that, when executed by the at least one processor, cause the at least one processor to carry out a method. The method comprises in response to determining, from an analysis of one or more images captured by the camera, that the one or more images include image data corresponding to both a first field of view of the camera and a second field of view of the camera, the first field of view being noncontiguous with the second field of view: generating an image capture interface displaying image information from the first field of view in a first portion of the display and image information from the second field of view in a second portion of the display.

In another embodiment, there is provided a mobile device. The mobile device comprises a camera; at least one processor; and at least one storage medium having encoded thereon executable instructions that, when executed by the at least one processor, cause the at least one processor to carry out a method. The method comprises in response to determining that images captured by the camera include image data corresponding to both a first field of view and to a second field of view, the first field of view being noncontiguous with the second field of view, adjusting image capture parameters for capturing images from the first field of view and the second field of view, the adjusting comprising: setting first image capture parameters for capture of one or more images from the first field of view of the camera; and setting second image capture parameters for capture of one or more images from the second field of view of the camera, the second image capture parameter values being different from the first image capture parameter values.

In a further embodiment, there is provided at least one non-transitory computer-readable storage medium having encoded thereon executable instructions that, when executed by at least one processor, cause the at least one processor to carry out any one or any combination of the foregoing methods.

In another embodiment, there is provided an apparatus comprising at least one processor and at least one storage medium having encoded thereon executable instructions that, when executed by the at least one processor, cause the at least one processor to carry out any one or any combination of the foregoing methods.

BRIEF DESCRIPTION OF DRAWINGS

The accompanying drawings are not intended to be drawn to scale. In the drawings, each identical or nearly identical component that is illustrated in various figures in represented by a like numeral. For purposed of clarity, not every component may be labeled in every drawing. In the drawings:

FIGS. 2A-C are illustrations of an example of a user interface, for use with a mobile device, for displaying multiple fields of view captured by a camera of the mobile device;

FIGS. 7A-C are different views of an embodiment of the exemplary mobile device case of FIG. 6;

FIGS. 8A-C are different views of a portion of a mobile device case that houses an optical element, in accordance with the embodiment of FIG. 6;

FIGS. 9A-B are side views of a mobile device case with optical elements attached to the case;

DETAILED DESCRIPTION

Figure 1A:
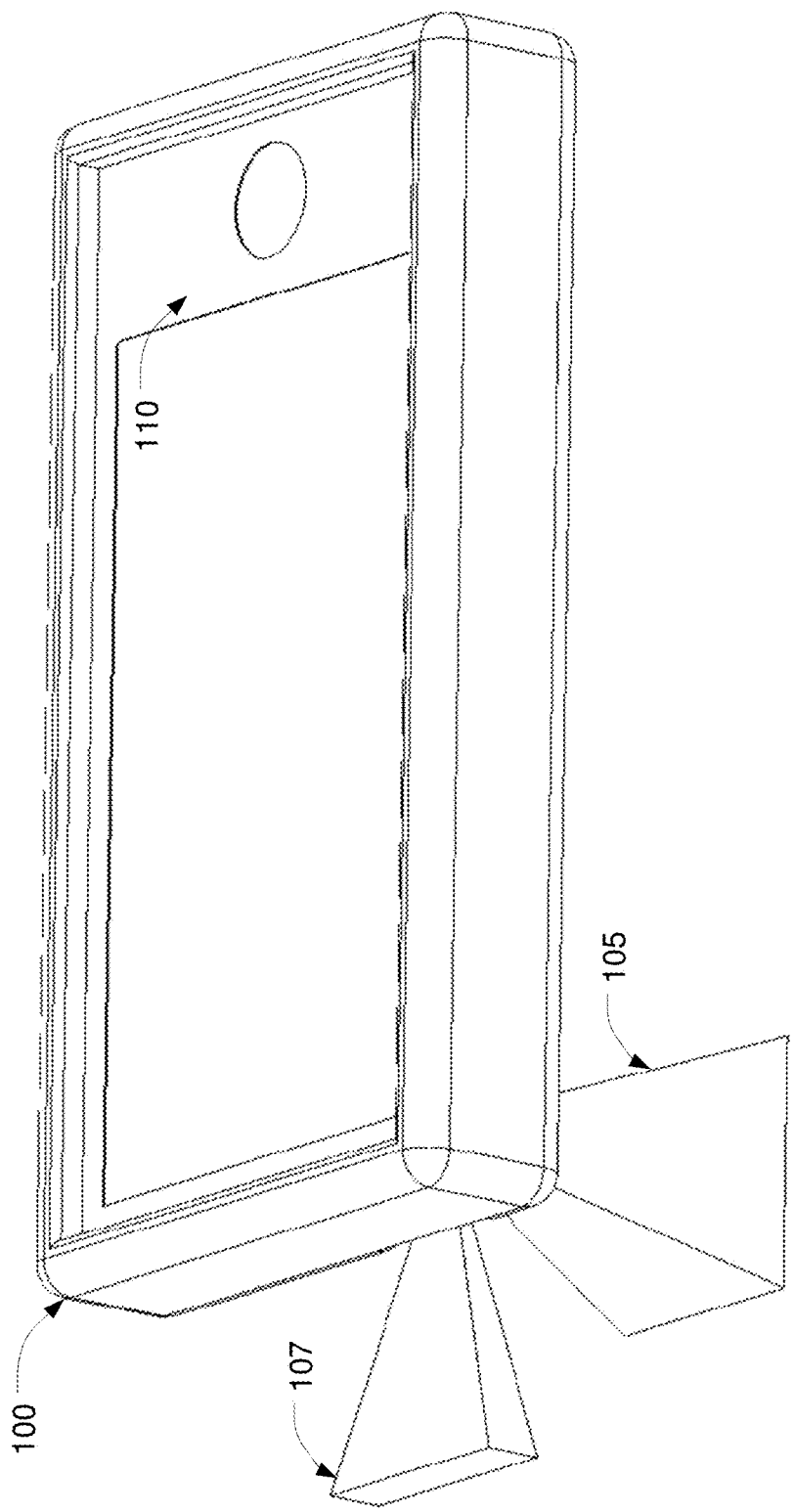
FIGS. 1A-C are illustrations of an exemplary mobile device case that allows a mobile device camera to view multiple fields of view simultaneously.

Described herein are embodiments of a mobile device case that allow a camera of the mobile device to view and/or capture images from multiple fields of view. For example, the case may allow the mobile device camera to simultaneously capture image information from multiple different directions relative to the camera or mobile device. Such directions may, for example, be orthogonal to one another or disposed between 45 degrees and 90 degrees away from one another. In other examples, the directions may be between 20-170 degrees away from another. Although example angle values are given, the mobile device case can be configured such that the directions between fields of view differ by any angle, as embodiments are not limited to any particular range or value of difference. The fields of view may also, in some embodiments, not be contiguous fields of view, such that there is a gap or other discontinuity between the fields of view. In some embodiments, one field of view may be a field visible from or facing a surface of the mobile device on which the camera is disposed (e.g., the back of the mobile device) and another field of view may be one visible from or facing a different surface of the mobile device, such as an adjacent surface like the top of the mobile device. Accordingly, viewing the mobile device simplistically as a rectangular prism having only six sides, in some embodiments, the fields of view may be visible from or facing different sides of the six sides.

Some embodiments may further include techniques for configuring the mobile device to capture and/or process images from each of the multiple fields of view. While conventionally, a mobile device may be configured with only a single set of capture parameters (e.g., exposure parameters) that are to be applied to an entirety of a captured image, in some embodiments in which a case enables a mobile device's camera to view multiple fields of view at the same time, the mobile device may be arranged to use different capture parameters for different fields of view. Some embodiments may further include techniques for detecting the ability to view and/or capture multiple fields of view with a mobile device camera. Some such embodiments may include techniques for identifying where each field of view is located within the view of the camera, such as by identifying portions of the camera's view that correspond to each field of view and/or identifying a boundary between the fields of view.

The inventors have recognized and appreciated that conventional systems and devices used for bar code scanning and scanning of other information (e.g., via optical character recognition (OCR), object recognition) are limited in ways that make them difficult for users to operate. For example, most conventional systems require specially-designed and application-specific hardware, such as a special device built solely for scanning/capture of bar codes. This special device may be a hand-held bar code scanner. Such special-purpose hardware increases costs at least in view of the cost of purchasing and maintaining this equipment, and may additionally increase costs as users may need to be trained to use such hardware.

Solutions have been proposed that leverage general purpose devices, such as mobile devices like smart phones or tablets, as devices that may be used to execute software for capture of bar codes. The inventors have recognized and appreciated, however, that many such solutions are limited in their effectiveness. For example, due to the fine geometry of some barcodes, capturing an image of the barcode with no or with limited blur may be important. Capturing images without blur using a mobile device includes triggering performance of focusing procedures of a camera of the mobile device, such as autofocusing procedures. In a mobile device, the focusing procedures may take a relatively long time to focus on a barcode. The delay in focusing procedures may frustrate users, as capture of bar codes is often a task completed quickly. Some mobile devices cameras may also not have sufficient resolution to capture bar codes effectively. Those skilled in the art have therefore understood that mobile devices are not generally well-suited for capture of bar codes, and specialized hardware has been favored.

Further, even if a mobile device were adapted for use as a bar code scanner in a manner that would overcome or mitigate these limitations, the inventors recognized and appreciated that the form factor of the mobile device does not lend itself to scanning of bar codes in a manner that users find natural. Most mobile devices that include a camera have the camera on a front surface or back surface of the device. This placement may work well for capturing images of friends, family, landscapes, etc.—common uses of mobile device cameras—but is not well suited for capture of bar codes. Special-purpose hardware for capture of bar codes typically permits a user to "point" the hardware at a bar code that is to be captured. Users find this motion natura, and expect it for capture of bar codes. The inventors recognized and appreciated that, with a camera on a front or back surface, a mobile device cannot be "pointed" in the same way, but instead is generally oriented toward the bar code while a user presses a button somewhere on the device (e.g., a soft button on a touchscreen, or a hardware button).

The inventors have recognized and appreciated the advantages of a system that enables a user to "point" a mobile device at a bar code and capture the bar code. For example, such a system may enable a bar code oriented in a direction facing a top of a mobile device to be captured, using a camera disposed on a back of the mobile device. Such a system may include a case to be used together with the mobile device, including one or more optical elements for conveying light from the top of the mobile device to the camera.

The inventors have additionally recognized and appreciated, however, that one of the advantages of using a mobile device as a bar code scanner is that the mobile device is a general-purpose device and may be used for many different tasks, in addition to bar code scanning. If the mobile device were placed in a case that allows the camera to capture images from a field of view facing a top of the device and case, this might improve a user's experience in bar code scanning, but might prevent a user from otherwise operating the mobile device to capture images normally, in connection with other tasks.

The inventors further recognized and appreciated that while users would primarily operate a mobile device to capture a bar code by "pointing" the top of the mobile device at the bar code, in some other situations—such as in some situations in which a 2D bar code such as a QR code is to be scanned—a user may prefer to capture a bar code by orienting the camera, and the surface of the mobile device having the camera, toward the bar code as in other image capture scenarios.

The inventors recognized and appreciated that one potential solution to this difficulty is providing a case that includes mechanically-adjustable optical elements, where the optical elements could be adjusted (e.g., moved) in one manner to allow capture of bar codes by "pointing" the top of the mobile device at the bar code or adjusted in another manner to allow capture of bar codes by orienting a camera of the mobile device toward the bar code. The inventors additionally recognized and appreciated, though, that given the life span of bar code scanners and the frequency of scanning of bar codes with such scanners, the components would be moved often and would likely be subject to high breakage rates that would frustrate users. Furthermore, the time required to adjust mechanical parts would reduce productivity of users in scanning of bar codes.

The inventors also recognized and appreciated that while a case might be designed that would not have movable components and would instead include fixed components that split a field of view of a mobile device camera into multiple fields, the mobile device would not be suited to capture of bar codes in this manner. Such a case could be designed to split a field of view of a camera to allow for viewing barcodes in one field of view (e.g., oriented toward a top of a mobile device) and another field of view (e.g., oriented toward a back of a mobile device). The inventors recognized and appreciated inherent challenges in such an approach, however. Mobile devices are designed for camera operations, such as exposure control and autofocusing, that are performed across an entirety or a portion of a single field of view of the camera, to capture an image using the entire field of view. Due to the limitations of mobile devices in capturing bar codes (discussed above), capturing bar codes using mobile devices would benefit from careful setting of those same exposure and autofocusing parameters for the bar code to be scanned and the environment of the bar code (e.g., lighting of the environment). However, when the camera's field of view is split, there will be two different environments in which bar codes could be scanned, and a bar code could appear in either or both. Those two environments may correspond to different exposure and focusing parameters, if bar codes were to be optimally captured in either. However, each environment forms only a part of the image. Setting exposure and focusing for an entirety or a large portion of an image, as conventional mobile devices are designed to do, would lead to capture of images of bar codes without exposure and focusing parameters set for the bar code to be captured, which would undermine processing and recognition of the bar code.

The inventors have recognized and appreciated, therefore, that there are inherent challenges to adapting a mobile device for use as a bar code scanner. However, if a mobile device could be adapted for use as a bar code scanner, there could be savings by avoiding the need for dedicated hardware, and limit the number of different devices that employees or others that scan bar codes and handle other tasks need to use as part of their role, as the mobile device may be able to assist with bar code scanning and those other tasks. The inventors have thus recognized and appreciated the desirability of a system that would enable a camera(s) of a mobile device to point at a bar code to scan that bar code while maintaining the mobile device's ability to capture other images with the same camera(s). The inventors have recognized and appreciated that systems and techniques that enable use an existing camera on a mobile device would eliminate a need for specialized hardware and/or addition of imaging hardware and software. The inventors have further recognized and appreciated that a camera that can view multiple (e.g., two or more) fields of view at the same time, and potentially capture images in multiple fields of view at the same time, would provide such flexibility. In such a system, for example, a first field of view can be configured for detecting and reading bar codes while a second field of view can be configured for otherwise capturing images in connection with other tasks. In other embodiments, a user may operate the mobile device to capture bar codes in either field of view, which may provide flexibility to a user in determining how to operate the device.

Accordingly, described herein are various embodiments of a case that enables a camera of a mobile device to view multiple fields of view at one time. In some embodiments, a case may include two or more openings and one or more optical elements. Light may reach the camera via the openings and/or optical elements. For example, one or more of the openings may expose fields of view directly to the camera, while the optical element(s) may convey light from others of the fields of view and others of the openings, to the camera. By allowing light to reach the camera from multiple different openings, directly and/or via optical elements, the case enables the camera to view multiple different fields of view simultaneously.

Also described herein are techniques that may be used in some embodiments to configure a mobile device to operate the camera to view and/or capture the multiple fields of view, such as by detecting that the camera can view multiple fields of view and/or by configuring the device to use different capture parameters for different fields of view.

The inventors have recognized and appreciated that when a mobile device is used as a bar code scanner, the mobile device may be used for different tasks and, from time to time, users may dispose the mobile device in different types of cases. Some cases may require the mobile device to be configured in a certain manner—such as the type of cases described herein for bar code scanning in multiple directions. In such scenarios, different cases may be compatible with or enable different mobile device functionalities. It may therefore be helpful or desirable to detect whether a case is attached, and what case is attached, to determine whether to enable particular functionalities associated with the case or whether such functionalities are enabled Accordingly, the inventors have recognized and appreciated the desirability of enabling a mobile device to detect that it is disposed in a certain type of case, or otherwise identify a type of case in which the mobile device is disposed. For example, the inventors have recognized the desirability of enabling a mobile device to determine whether the mobile device is disposed in a case that allows a camera of the mobile device to view multiple fields of view simultaneously. The determination can be used to intelligently enable and/or disable functionalities in order to use computational and power resources efficiently, and to automatically determine a mode to enable without requiring input from a user. For example, when it is detected that the mobile device is placed in such a multi-view case, the mobile device may be configured to present a user interface that enables a user to selectively capture images from one of the fields of view, and/or enable the mobile device to use different capture parameters (e.g., exposure parameters) to capture images in the different fields of view. When it is detected that the mobile device is not in a multi-view case, such functionality may not be presented to a user or may be disabled.

Some embodiments therefore provide techniques for determining whether a mobile device is placed in a case. According to some embodiments, techniques are provided for determining whether the mobile device is placed in a specific type of case. In some embodiments, the techniques may enable certain functionalities associated with the case.

According to some embodiments, techniques are provided for determining whether the mobile device is placed in a case that allows a camera of the mobile device to capture images from multiple fields of view or capture an image that includes multiple fields of view. In some embodiments, the techniques utilize mobile device sensor information (e.g., gyroscope, accelerometer, light sensor) as part of determining whether the mobile device is disposed inside a case that includes an optical element allowing the camera to capture multiple fields of view. Based on a determination that the mobile device is placed in such a case, according to some embodiments, the mobile device can be configured to analyze image data for a presence of bar codes in the fields of view captured by the camera.

As mentioned above, the inventors have also recognized and appreciated that conventional mobile device cameras are designed and built to capture a single field of view and that mobile devices are thus not configured to effectively capture and display image information captured from multiple fields of view. The inventors recognized and appreciated that it may be advantageous to configure a mobile device to perform image capture in a different manner when a camera is able to view multiples fields of view simultaneously. For example, the inventors have recognized the desirability of techniques that enable a mobile device to identify the portions of a camera's view that correspond to different fields of view, such as by identifying a boundary between image information captured from multiple different views. Such a boundary, once identified, could be used to effectively set image capture parameter settings for one or more specific fields of view, display the multiple fields of view in a display of the mobile device, and/or process image data captured from the different fields of view.

Accordingly, in some embodiments, techniques are provided for determining a position of a boundary between two fields of view in images captured by the camera. When disposed in a case that allows the mobile device camera to capture multiple fields of view, images captured by the camera may include image data from the multiple fields of view. Techniques may be used for analyzing one or more images captured by the camera to identify, in the one or more images, a boundary between image data of a first field of view and image data of a second field of view. Furthermore, some embodiments provide systems and methods for generating an image capture interface to display image information from the multiple fields of view on a display (e.g., a screen) of the mobile device. For example, for displaying the multiple fields of view in a user interface of a mobile application. In another example, the boundary may be utilized to generate a user interface displaying only one of the multiple fields of view and not displaying image information from another of the multiple fields of view.

The inventors have also recognized and appreciated that because mobile devices are designed to capture images from a single field of view, the mobile devices are also configured to set image capture parameters (e.g., exposure or focus parameters) for a single field of view. When a camera is able to view and/or capture images in multiple fields of view at once, a single set of capture parameters may not be sufficient. This may be because the focus point in different fields of view may be different, or the lighting in different fields of view may be different, or circumstances between the fields of view may otherwise vary. To capture quality images in each of the fields of view, it may be helpful to be able to set different image capture parameters for the different fields of view.

Some embodiments therefore include techniques for adjusting the mobile device camera to effectively capture images from multiple fields of view. For example, techniques are provided for adjusting image capture parameters to optimize or improve image quality, ability to scan or detect a bar code, and/or capture other information via the camera. According to some embodiments, image capture parameters can be set differently for each of the multiple fields of view. This may aid in allowing the mobile device to more effectively capture photos, scan bar codes, and carry out other tasks employing image data from two fields of view without having to remove the case.

Described below are various embodiments of cases and techniques that may be used for viewing multiple fields of view from a camera of a mobile device and/or for capturing images from one or more of the fields of view. It should be appreciated that while specific embodiments are described, those embodiments are illustrative to aid in understanding the principles described herein, and that other embodiments are possible. Embodiments are not limited to operating in accordance with any of the examples set out below.

Although systems and techniques of embodiments are discussed herein with reference to bar code scanning, the systems and techniques may be adapted for various other types of scanning and/or recognition, as embodiments are not limited in this respect. For example, the systems and techniques can be adapted for object recognition to identify objects in a field of view. Known machine vision techniques may be incorporated to scan or recognize objects in a mobile device camera field of view. In another example, the systems and techniques may be adapted to read or scan product names, prices, descriptions, and other information about products. The information may, for example, be read using optical character recognition (OCR) techniques or other known techniques.

Figure 1B:
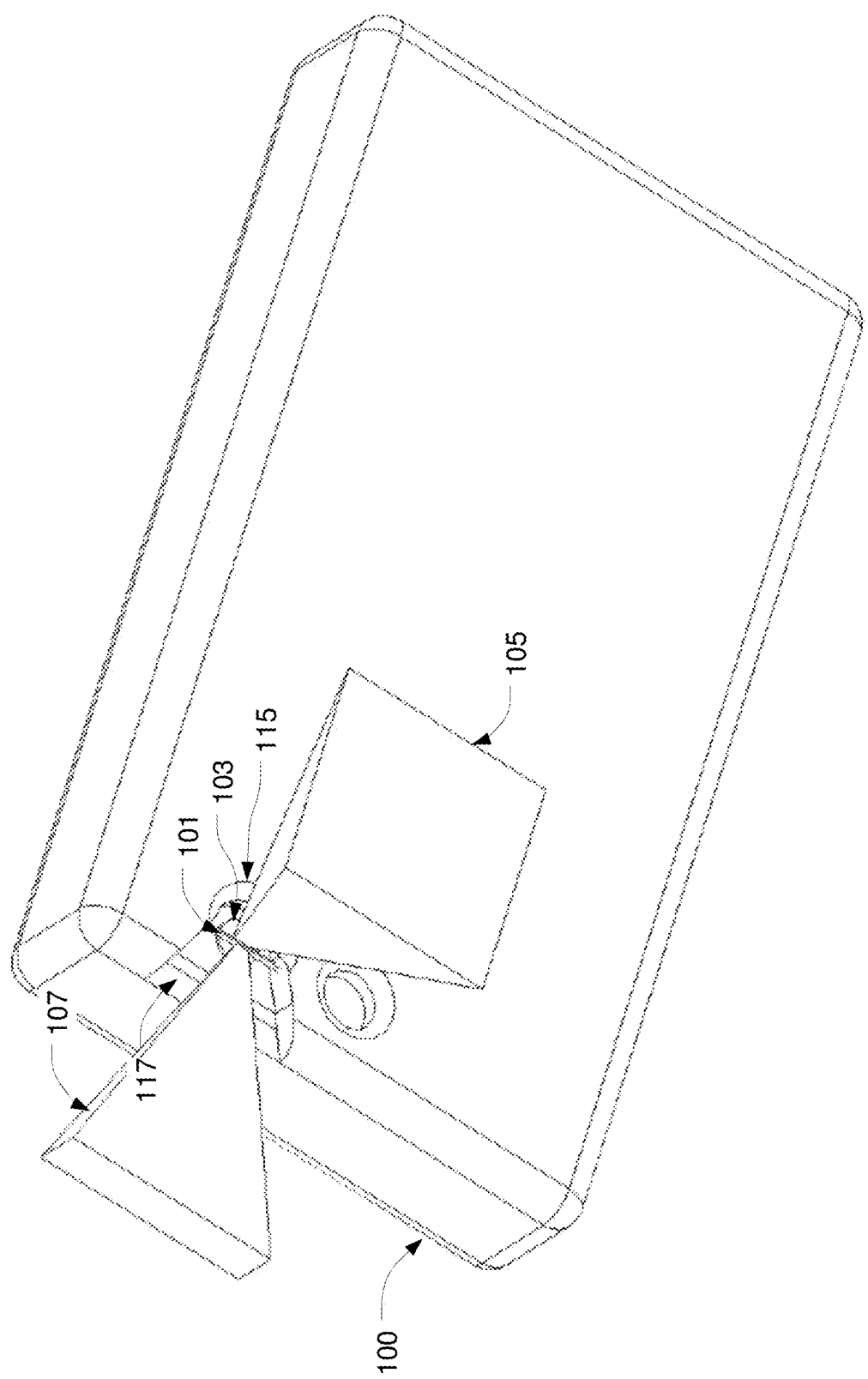
Figure 1C:
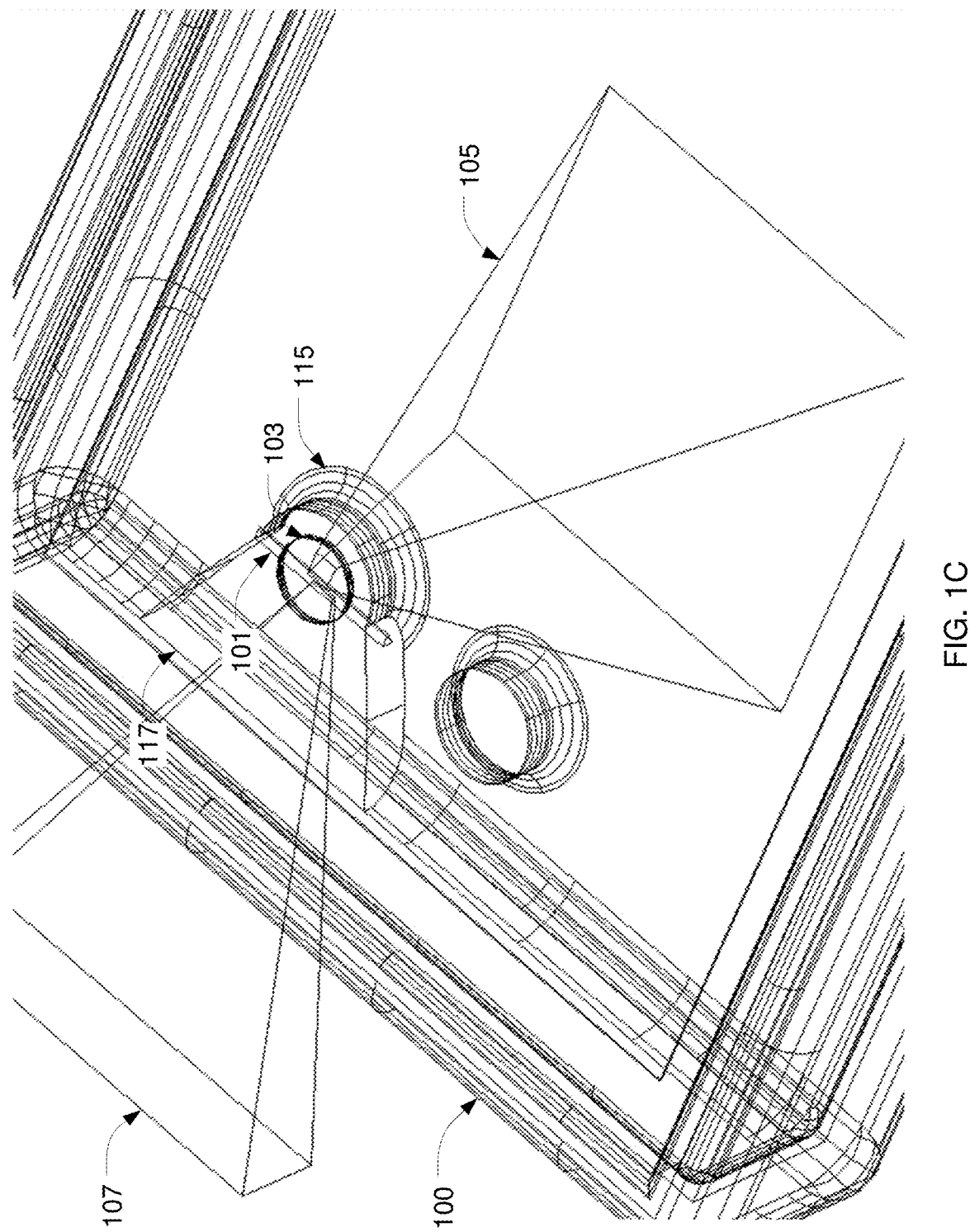

FIGS. 1A-C (which may be collectively referred to as "FIG. 1" below, for ease of reference) illustrate an embodiment of a mobile device case 100 that allows a camera 103 of a mobile device 110 placed inside the case 100 to view multiple fields of view simultaneously. In some embodiments, the mobile device case 100 may allow the camera 103 to simultaneously view a first field of view 105 and a second field of view 107. The mobile device case 100 may include a first opening 115 and a second opening 117 (shown in FIGS. 1B and 1C) through which light can reach the camera 103. The mobile device case 100 may also include one or more optical elements 101 arranged to convey light to the camera 103. Such optical element(s) 101 may, for example, include one or more mirrors, one or more prisms, or a combination of different optical elements.

The mobile device 110 may be a mobile phone, tablet, or other portable device having one or more cameras. Such a mobile device 110 may be intended to be handheld during normal use, such that it may be designed to be comfortably held and operated with one hand, or designed to be comfortably held in one hand while operated with the other hand, and may be designed to be held in a hand and operated while a user is walking or standing. Such a device may, in some embodiments, have dimensions that are all less than 12 inches, including a thickness dimension that is less than 1 inch. In some cases, such as in the case of a mobile phone, the mobile device 110 may be designed to be carried in a pants pocket. The mobile device may also have wireless connectivity, to connect to one or more wireless networks in an environment, such as a wireless local area network (WLAN) and/or wireless wide area network (WWAN) that covers the environment. Such a WWAN may include a cellular network. For example, the mobile device 110 may be an Apple iPhone 8 or iPad, or the mobile device may be a Samsung Galaxy Note 7 mobile phone. The mobile device case 100 can be configured and adjusted for different types of mobile device types. Embodiments described herein are not limited to any particular type or model of a mobile device.

The case 100 may be shaped to receive and hold at least a part of the device 110. For example, a housing of the case 100 may have an inner shape that corresponds to an outer shape of the device 110, such that the device 110 and the housing have a complementary shape. While in the example of FIG. 1, the case 100 is arranged to wrap around an entirety of the device 110 to hold the device 100, embodiments are not so limited, and a case may have a shape corresponding to only part of a device 110 in some embodiments. For example, a case 100 may be arranged as a piece that is slid onto a top portion (e.g., top half) of a device 100, without wrapping around a bottom portion of the device 110.

In some embodiments, the first opening 115 may be aligned with the camera 103 on a back surface of the mobile device case 100. The second opening 117 may be made on a top surface of the mobile device case 100. In some embodiments, the mobile device case 100 allows light to reach the camera 103 via the first opening 115 and the second opening 117 to allow the camera to view multiple noncontiguous fields of view: light from the first opening 115 may reach the camera 103 to allow the camera 103 to view the first field of view 105, and the optical element 101 may be arranged to convey light from the second opening 117 to the camera 103 to allow the camera 103 to view the second field of view 107, with the first and second fields of view being noncontiguous. For example, light from each opening may reach a different portion of a lens of the camera. The optical element 101 may, for example, comprise a mirror or prism that receives light from the second opening 117 on the top surface of the mobile device case 100 and redirects the light to the camera 103. In this manner, the mobile device case 100 enables the camera 103 to simultaneously view multiple fields of view.

In the embodiment of FIGS. 1A-1C, light from the first opening 115 reaches the camera 103 directly via the first opening. It should be appreciated, however, that in other embodiments, one or more additional optical elements may convey light to the camera 103 via the first opening 115, similar to the optical element(s) 101 that convey light to the camera 103 from the second opening 117. The additional optical element may be arranged to convey light to the camera 103 via the first opening 115 to generate the first field of view 105. In some embodiments, a single optical element (e.g., optical element 101) may be arranged to convey light received via the first opening 115 to the camera 103 and to convey light received via the second opening 117 to the camera to generate both the first and second fields of view.

In some embodiments, the first field of view 105 may be substantially similar to a field of view of the camera 103 when the mobile device 110 is not placed in the case 100. For example, the first opening 115 may correspond to a back surface of the mobile device 110 and allow light to reach the camera 103 similar to how the light reaches the camera 103 without the case 100. In some embodiments, the optical element 101 may be built and positioned such that the field of view of the camera 103 is not split equally between the first and second fields of view 105, 107. Instead, the field of view of the camera 103 may be split so as to have a majority of the view of the camera 103 correspond to the first field of view 105. This may be, in various embodiments, more than half (50 percent), more than two-thirds (more than 66 percent), more than three-quarters (more than 75 percent), or four-fifths (80 percent). The size of the field of view of the camera 103 that corresponds to the second field of view 107 (e.g., in some embodiments, 20 percent), may be set to correspond to expected dimensions of bar codes to be scanned via the second field of view 107. This may have a benefit of increasing an amount of the field of view of the camera 103 that is available for capturing images for purposes other than scanning of bar codes, to limit difference in usability between using the mobile device 110 to capture images without the case 100 as compared to capturing images with the case 100.

According to some embodiments, the case 100 may be arranged such that, when the mobile device 110 is held with a screen facing up and a top of the device 110 facing forward, the first field of view 105 becomes a downward field of view and the second field of view 107 becomes a forward field of view. This may enable a user to point the top of the device 110, when the device 110 is placed in case 100, at a bar code and align the forward field of view 107 with the bar code. The camera 103 can view the bar code in the forward field of view 107 via the second opening 117 and the optical element 101 and capture an image of the bar code that is disposed at a position relative to the device 110 that the camera 103 could not capture without case 100. However, because of the split field of view, with the mobile device 110 still in the case 100, the user can capture images from the first field of view 105. A user may, for example, rotate the device 110 away from the "pointing" position such that the camera 103 can capture an image in the first field of view 105 as the camera 103 would without being placed in the case 100 (e.g., to take a photograph).

Although FIGS. 1A-C illustrate a mobile device 110 with a single camera 103, as discussed in more detail below in connection with FIG. 5, in some embodiments the mobile device 110 may include multiple cameras. In some embodiments, a case may be configured to allow each of the mobile device cameras to view a different field of view or parts of a different field of view from the other camera. For example, a first camera can be configured to view the first field of view 105 and a second camera can be configured to view the second field of view 107. In some embodiments, a first opening 115 may be aligned with the first camera and the optical element(s) 101 may convey light from a second opening 117 to the second camera. The first opening 115 may, for example, allow light to reach the first camera and allow the first camera to view the first field of view 105. The optical element(s) 101 (e.g., a mirror or prism) may be disposed in the case such that the optical element 101 conveys light from the second opening 117 to the second camera. The second camera may then view the second field of view 117. In this manner, the case can allow a mobile device with multiple cameras to simultaneously view multiple fields of view.

In some embodiments, the mobile device case 100 may be configured to generate an aimer light pattern using a light source (e.g., flash of the mobile device 110, such as one or more LEDs or other light source that is a component of the mobile device 110) of the mobile device 110. The light pattern may be used as a visual aid for scanning bar codes, as a sign of where the mobile device camera 103 (via an opening of the case 100 and any intervening optical elements) is "pointed." In some embodiments, the mobile device case 100 may include one or more second optical elements defining aimer optics. The second optical elements of the aimer optics may for example, be placed proximate and/or along an (and defining an) optical path from the light source to the exterior of the case 100, when the mobile device 110 is placed inside the case 100. The aimer optics can be arranged to redirect (including focusing, collimating, coloring, and/or polarizing) and/or reshape light from the light source to generate the aimer light pattern. Such a pattern may be, for example, a dot or circle identifying a center of one of the fields of view created by the case 100, or a line similarly identifying the position of one of the fields of view created by the case 100, or other pattern or shape. For example, the second optical element of the aimer optics may include one or more lenses, mirrors, prisms, or any combination thereof to generate a pattern or a specific geometry (e.g., a rectangle, circle, or other shape). In some embodiments, the aimer optics may also redirect the light from the flash. The aimer optics can be arranged to direct the light from the light source to provide a visual aid for one of the multiple fields of view. For example, a user may use the second field of view 107 viewed by the camera 103 to scan a bar code. The second optical element can be configured to project an aimer light pattern to assist in aiming the second field of view 107. In particular, the second optical element(s) of the aimer optics may redirect and shape the light from the light source of the mobile device 110) to generate a projection of a rectangle or other shape indicating a portion (e.g., all) of the second field of view 107 viewed by the camera 103. A user can use the aimer light pattern to aim the mobile device 110 placed inside the case 100 for various applications (e.g., scanning of small bar codes). In some embodiments, the second optical element(s) may include a mirror or prism that redirects LED/flash light to generate the aimer optic. The mirror or prism may include a coating that filters wavelengths of light passing through the mirror or prism. In some embodiments, the coating may be used to create an aimer light pattern using light of a particular color. For example, the mirror or prism can be lined with coating that allows only wavelengths of light associated with a red color to be deflected or directed to create a red aimer light pattern.

In some embodiments, the optical element(s) 101 for conveying light from a field of view to the camera may be or include one or more mirrors. A mirror may be sized, shaped, and placed in the case such that the mirror reflects light from the second field of view 107 to the camera 103. In some embodiments, the mirror may be formed or positioned in the case 100 to reduce or minimize how much of an edge of the mirror is visible in a view of the camera 103 and would appear in an image captured using camera 103. In some embodiments, an entirety of a surface area of the element 101 (or the element of the elements 101 that is a mirror), or an entirety of the face(s) of the element 101, may be mirrored such that when the camera 103 "sees" the face of the mirror, it is "seeing" the reflected light from the second field of view 107. An edge of the mirror, however, corresponding to a thickness of the element 101, may not reflect light in the same way from the same angles, or may not be mirrored in some embodiments, and so may appear differently to the camera 103 than the face of the element 101. This may cause the edge to be viewable by the camera 103 as, for example, a dark line extending through a part of the field of view of the camera 103.

The mirror edge may be chamfered such that a small portion of the mirror blocks a portion of the view of the camera 103. In some embodiments, the mirror may be curved. The curved mirror may allow capturing of a larger second field of view 107 than a straight mirror. Alternatively, the curved mirror, which increases the size of the field of view relative to a straight mirror, may allow for decreasing the size of the mirror used to generate the second field of view 107. Accordingly, a smaller portion of the camera view may be used for the second field of view 107. Allocating a smaller portion to the second field of view 107 may allow for retaining a larger percentage of the mobile device camera's view for the first field of view 105. This may, for example, make the ability of the mobile device 110 when placed in the case 100 to capture photos in the first field of view 105 closer to the ability of the mobile device 110 to capture photos when outside of the case 100.

In some embodiments, the curvature of a mirror may be adjusted as desired to achieve a given field of view size. For example, the curvature of the mirror may be adjusted such that a smaller field of view size for reading bar codes is provided in the second field of view 107 and a larger field of view size is provide in the first field of view 105. In some embodiments, the curvature of the mirror may be adjusted to increase the size of the second field of view 107 such that larger bar codes may be easily scanned by the mobile device via the second field of view 107. For example, the curvature of the mirror can increase an area captured by the field of view such that 2D bar codes (e.g., QR codes, or datamatrix codes) may be easily scanned via the second field of view 107.

In some embodiments, the optical element(s) 101 for conveying light from a field of view may be or include one or more prisms. A prism may be a triangular shape into which light enters the prism and is reflected to the camera 103 of the device 110. In some embodiments, the prism may include a first surface through which light enters the prism, a second surface that deflects the light, and a third surface through which the light exits the prism. In some embodiments, the first surface of the prism may have an anti-reflective coating to increase capture of light from the field of view. For example, the anti-reflective coating may reduce a loss of light intensity as a result of light entering the prism.

The second surface may include a reflective coating that deflects the light to the third surface through which the light may reach the camera 103. In some embodiments, the prism may be built and positioned in the case 100 such that light entering from a different field of view than the field of view intended for capture by the prism may be deflected away from the camera. For example, the prism may be positioned in the case 100 to convey light from the second field of view 107 to the camera. The prism may be built and shaped such that light from the first field of view 105 may be deflected away from the camera. For example, an outer surface of a prism surface that may receive light from the first field of view 105 may deflect that light away from the camera. Including such a prism may aid in maintaining separation between the multiple fields of view and increase clarity of capture via the second field of view 107 by reducing an amount of light from the first field of view 105 that "bleeds into" the part of the camera's field of view that is intended to receive light from the second field of view 107.

In some embodiments, the prism may have a side coated with a reflective coating. The side may receive light from a field of view and deflect the light to the camera 103. The prism may behave similar to a mirror that deflects light to the camera. In some embodiments, a prism coated with reflective coating may block a portion of the view of the camera 103 less than would a mirror. Accordingly, in some such embodiments, the prism with the reflective coating may be in place of a mirror, to serve a similar reflective purpose as a mirror. The shape of the prism may allow for different ways to position the prism and/or hold the prism in place. For example, the prism shape may allow the prism to be clamped differently than a mirror would be.

Some types of optical elements may invert image information that is conveyed to the camera. For example, a triangular prism may result in the camera receiving an inverted image. In one embodiment, a pentaprism may be used as the optical element to convey light to the camera such that the image information is not inverted. A pentaprism may enable conveying of light from the second field of view 107 to the device camera 103 without reversing an orientation of content in the second field of view 107. A pentaprism may be a prism with five sides that reflects light entering the prism twice such that an image may be transmitted to the camera 103 without changing an orientation of the image. For example, light may enter the pentaprism via a first surface. The light may then reach a second surface which deflects the light to a third surface. The third surface may again deflect the light to a fourth surface through which the light may reach the camera 103. When light travels through the pentaprism, the deflection off the second surface may invert the image and the subsequent deflection off the third surface may un-invert the image.

Although embodiments are described herein with reference to types of mirrors and prisms, embodiments are not limited to these optical elements. Specific types of optical elements discussed herein are provided for illustrative purposes only. Embodiments may include any suitable optical element(s) for conveying light to a mobile device camera and/or generating an aimer optic(s) as described herein.

FIGS. 2A-C illustrate an example of a user interface of a mobile device displaying multiple fields of view captured by a camera of the mobile device. In particular, FIGS. 2A-C show images of multiple fields of view viewed by a camera 103 of a mobile device 110 when placed inside the case 100 described above with respect to FIGS. 1A-C.

In some embodiments, the camera may view fields of view corresponding to two different directions. FIG. 2A illustrates a user interface screen 210 displaying image information from a camera (e.g. camera 103) viewing two separate fields of view. For example, the user interface may display a downward field of vision 213 (e.g., corresponding to first field of view 105) and a forward field of vision 211 (e.g., corresponding to second field of view 107). These may be the fields of view illustrated in the example of FIG. 1A. In some embodiments, image information from both fields of view may be displayed simultaneously. The user interface display may be adjusted to modify the ratio of display of each field of view. In some embodiments, one or more images captured by the camera including the two fields of view 211, 213 may include a boundary 215 between the fields of view as shown in screen 210. Techniques for identifying the boundary 215 between the two fields of view in an image, which may be implemented in some embodiments, are discussed in detail below.

In some embodiments, as discussed in more detail below in connection with FIG. 5, the mobile device may include two cameras, and a case may be arranged such that when the mobile device is placed inside the case each of the two cameras views a separate field of view. For example, a first and second camera can view first and second views 105, 107 respectively as discussed above with respect to FIGS. 1A-C. FIG. 2B illustrates a user interface screen 220 that displays image information viewed by two separate cameras of a mobile device each viewing a different field of view. For example, a first camera may receive light conveyed by an optical element from a first opening to generate a first field of view 222 and the second camera may receive light from a second opening to generate a second field of view 223. In some embodiments, one or more images captured by the camera including the two fields of view 222, 223 may include a boundary 225 between the fields of view.

FIG. 2C illustrates a user interface display 230 showing multiple fields of view in the image(s) viewed and/or captured by a camera of a mobile device. For example, camera 103 of mobile device 110 placed in case 100 may view field of view 105 and field of view 107. The user interface display 230 may display image information from the first field of view in a first portion of the screen 233 and image information from the second field of view in a second portion of the screen 231. For example, as shown in user interface display 230, the first portion 233 of the screen shows an image of a QR code captured by the camera in the first field of view and the second portion 231 of the screen shows an image of a bar code captured by the camera in the second field of view.

As should be appreciated from the foregoing discussion, the 2D bar code shown in portion 233 may be disposed facing a rear of a mobile device (when the camera is on the rear/back surface of the mobile device) and the 1D bar code shown in portion 231 may be disposed facing a top of the mobile device, according to the two fields of view of the example of FIG. 1A. While two bar codes are shown in FIG. 2C for ease of description and for illustrative effect, it may be rare that two bar codes may be displayed simultaneously in the user interface. It may be more common for a user to operate the mobile device, disposed in a case as described herein, to view and/or scan a bar code in one field of view or another at different times. Accordingly, it may be common for a bar code to appear in only one of the portions 231, 233 at a time.

In some embodiments, one or more images captured by the camera include a boundary 235 between the two fields of view in the image(s), which may be fixed or identified according to techniques described in the present disclosure.

It should be appreciated that the user interface of FIG. 2C is merely illustrative and that other user interfaces may be used. For example, according to some embodiments, a user interface may not simultaneously display image data for all or multiple fields of view, but may instead only display image data for one or some of the fields of view. In some such embodiments, a boundary between fields of view may be used to identify the different fields of view, after which a user interface may separate image data for the different fields of view and then display image information from only one or some of the multiple fields of view and not display image information from another field of view. This may be useful in some situations in which a user may not feel the need to view image information in one field of view while scanning a bar code in that field of view. The user may be able to point the device (e.g., using a light aimer pattern) and scan a bar code without having to view image information. In such a case, the user interface may not display image information for that field of view prior to or during scanning, or may not display the image information for that field of view prior to or during scanning unless the user requests display of the image information. In another embodiment, rather than separating image information for different fields of view into different regions of the user interface, image information from one field of view may be overlaid onto image information from another field of view, upon request of the user to display a field of view. In yet another embodiment, a separate user interface may be generated for each field of view, and a user may switch between user interfaces to switch between fields of view. For example, a first user interface may correspond to a first field of view and a second user interface may correspond to a second field of view. Each user interface may, for example, display image information from the corresponding field of view. Other user interfaces may be implemented in other embodiments, as embodiments are not limited in this respect.

Figure 3:
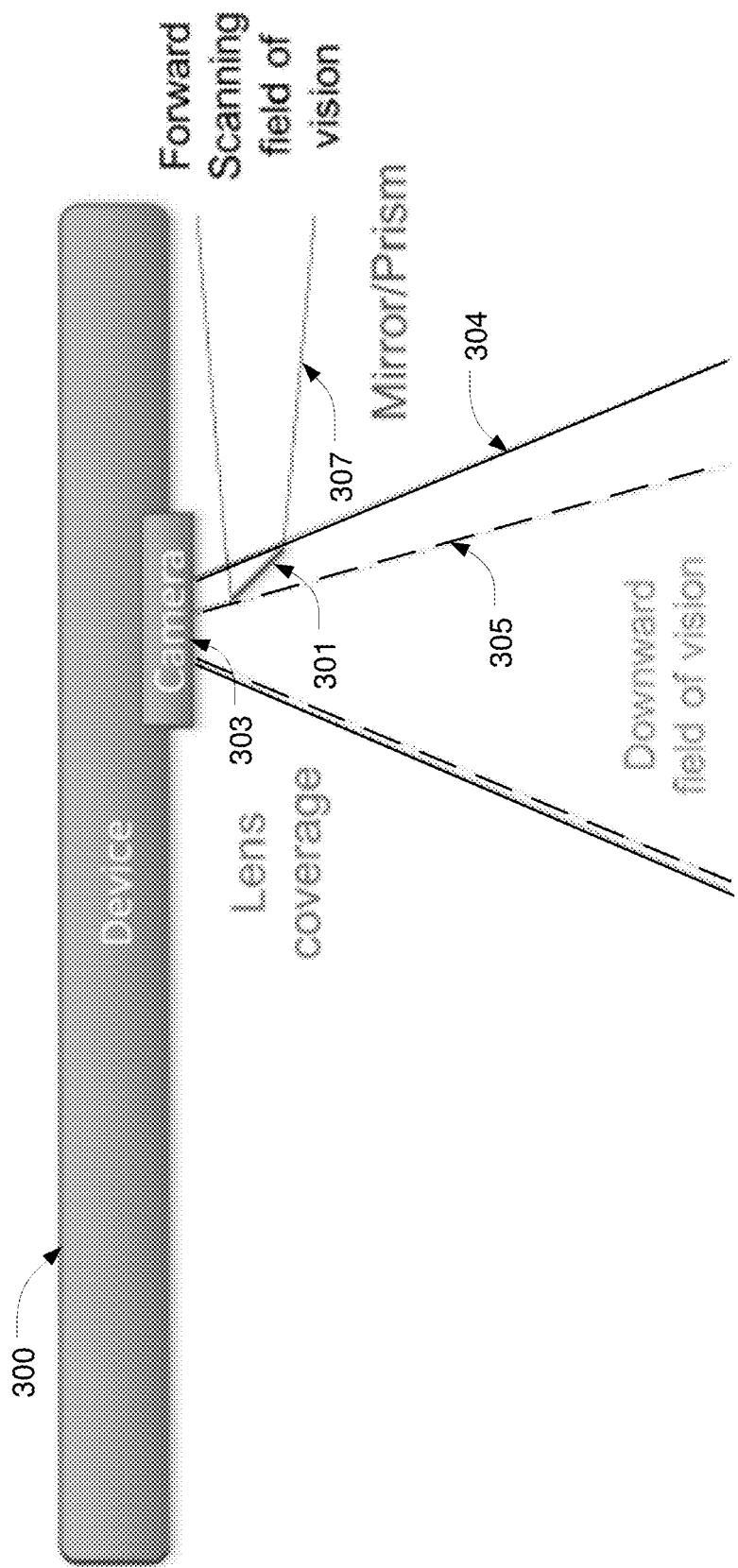
FIG. 3 is a diagram illustrating an optical element splitting a field of view of a mobile device camera into multiple fields of view.

FIG. 3 illustrates how an embodiment of a case (e.g., case 100) allows a device camera to view multiple fields of view, according to some embodiments. For example, FIG. 3 illustrates how the optical element(s) 101 inside device case 100 may allow device camera 103 to view multiple fields of view 105, 107 at a time, as described above with respect to FIG. 1.

As shown in FIG. 3, mobile device 300 may have a camera 303 with a single field of view 304 (also labeled "lens coverage" in FIG. 3) when the camera 303 is outside of a case. According to some embodiments, when the mobile device 300 is placed inside a case (e.g., case 100 discussed above with respect to FIG. 1), the camera 303 is able to view, simultaneously, multiple fields of view. For example, the camera 303 can have a downward field of view 305 and a forward field of view 307. The case may include an optical element 301 that is arranged to convey light from a different field of view to the camera 303. For example, the optical element 301 may be a mirror or prism placed proximate the camera 303 that receives light and deflects the light to a first portion of the camera 303 to enable the camera 303 to view the forward field of view. Simultaneously, light from the downward field of view 305 may reach the camera 303. In one example, as displayed in FIG. 3, the downward field of view 305 may include a portion of the single field of view 304 that is viewed by the camera 303 when it is not placed inside the case. Thus the camera 303, when placed inside the case, can still capture images similar to how the camera 303 would when outside the case while being able to also capture images from the forward field of view 307 by receiving light conveyed by the optical element 301.

According to some embodiments, the optical element 301 can be positioned, sized, and shaped to control a ratio of sizes of the fields of view. For example, a curvature of a mirror optical element can be modified to control the ratio of sizes of the fields of view. In some embodiments, the optical element 301 can be sized and positioned to reduce the forward field of view 307 and increase the downward field of view 305, such that the field of view 305 is larger than the field of view 307. For example, the optical element 301 sized, shaped, selected, formed, and/or placed to provide a small field of view size for a particular task (e.g., scanning of a 1D bar code). Reducing the forward field of view 307 size can, in some embodiments, provide sufficient forward-oriented bar code scanning with the device 300 (e.g., for 1D bar codes) while maintaining the image capture capabilities of the camera 303 to capture images as it does without being placed in a case. This may leverage that some 1D bar codes may be scanned with only a small field of view, such as one that captures only a portion of the height of the 1D bar code. Accordingly, the optical element 301 can be sized and positioned to achieve a small forward field of view size that achieves the desired performance. Furthermore, reducing the size of the forward field of view may also result, in some embodiments, in a corresponding reduction in the size of the optical element needed to allow the camera to view a forward field of view. This may allow the case (e.g., case 100) to be smaller, thinner, and/or lighter.

Figure 4:
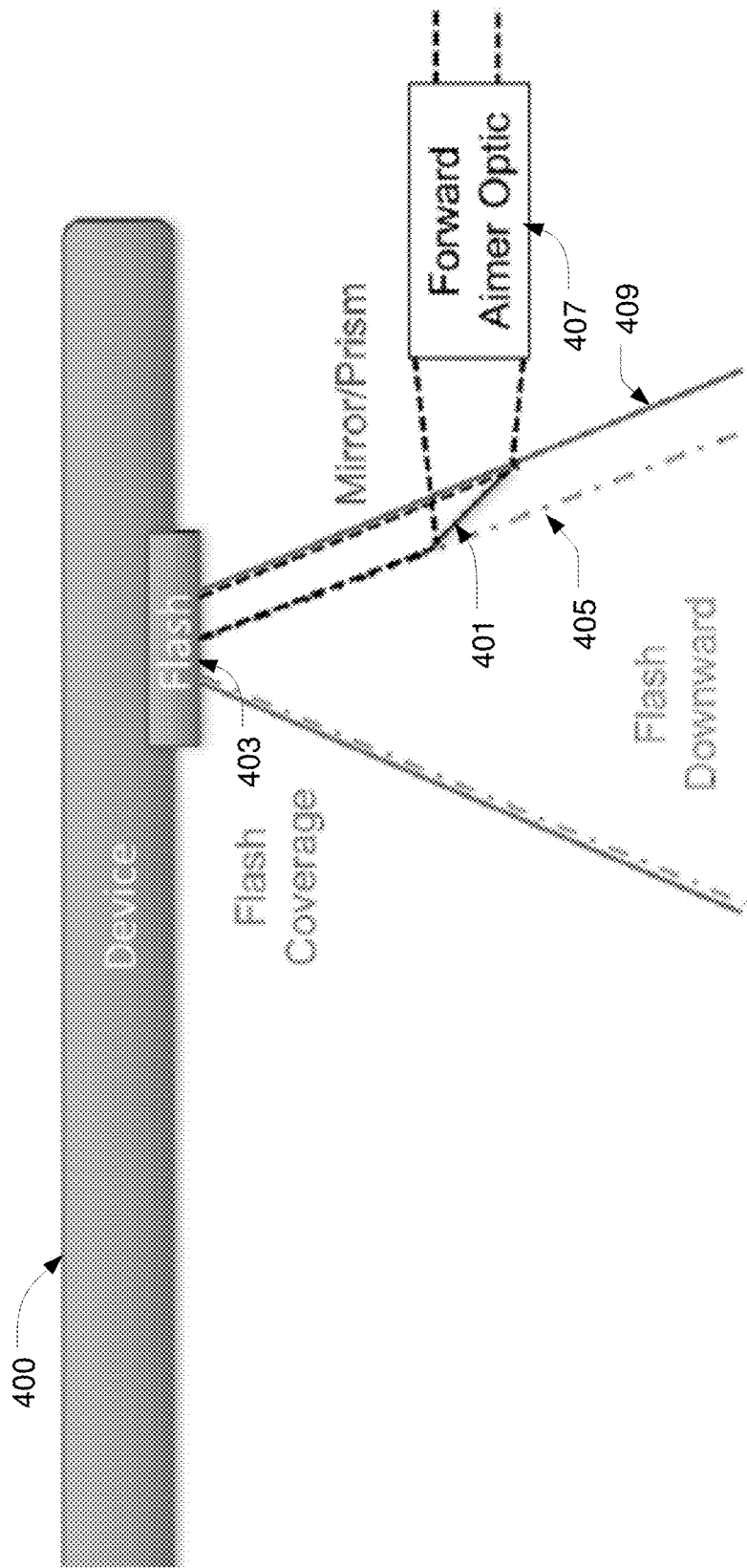
FIG. 4 is a diagram illustrating an optical element redirecting a flash of a mobile device through one or more optical elements to create an aiming guide for scanning of bar codes.

FIG. 4 illustrates how an embodiment of a device case (e.g., device case 100) can redirect light from a light source of the device (e.g., one or more LEDs or other light sources, which may be used by the mobile device as a flash for the camera) to create an aimer light pattern, according to some embodiments. For example, one or more optical elements inside device case 100 can generate a forward aimer light pattern using a light source of the device 110 as described above with respect to FIG. 1.

As shown in FIG. 4, mobile device 400 may have a flash 403 with a flash coverage 409 when the device 400 is outside of a case. According to some embodiments, when the mobile device 400 is placed inside a case (e.g., case 100 discussed above with respect to FIG. 1), optical elements 401, 407 in the case can be configured to generate a forward aimer light pattern. For example, using the mirror 401 and aimer optics 407, the case can generate, from light emitted from the light source of the mobile device 400, an aimer light pattern (e.g., a rectangle, target sign, or other optic) and project the pattern in a forward direction, as shown in FIG. 4. The aimer optic can assist a user, for example, in aligning the mobile device to appropriately capture a bar code image in a forward field of view of a camera of device 400. In some embodiments, the optical elements 401, 407 can include a lens placed proximate to or along an optical path from the light source 403, to receive light from the source 403 and shape and redirect the light to generate the aimer pattern. For example, the lens can redirect the light to generate a rectangular pattern or other target shape. In some embodiments, less than all of the light from the source 403 is redirected, such that light from the source 403 may also be directed downward 405. In one example, as displayed in FIG. 4, the downward portion 405 of the light may correspond to a part of the flash coverage 409 of the mobile device 400, corresponding to when the device 400 is not placed inside the case. Thus, in the embodiment of FIG. 4, the device 400, when placed inside the case, has a downward flash 405 for capturing images from a downward field of view (e.g., downward field of view 305) as well as forward aimer optic 407 for use with capturing images from a forward field of view (e.g., forward field of view 307).

Figure 5:
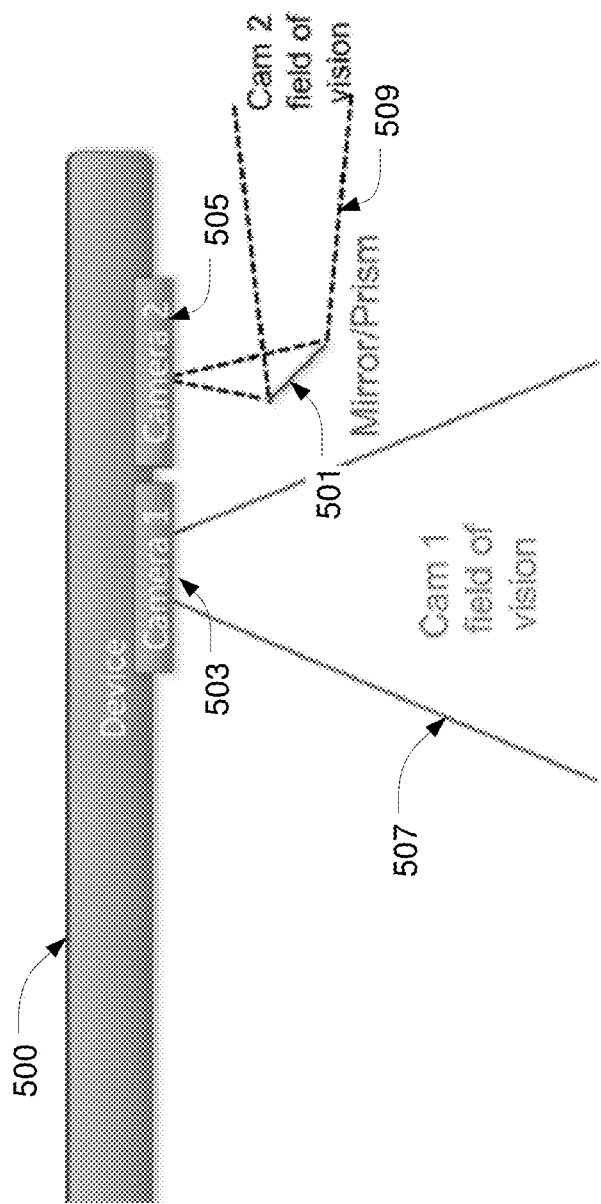
FIG. 5 is a diagram illustrating another embodiment of a case for capturing multiple fields of view, for use with a mobile device that includes two cameras.

FIG. 5 illustrates how an embodiment of a case can simultaneously capture two fields of view for a device with two cameras. Mobile device 500 includes a first camera 503 and a second camera 502. As illustrated in FIG. 5, both cameras may be arranged for use in what is shown in FIG. 5 as a downward-facing direction. A case allows for, at the same time, the first camera 503 to view a downward facing field of view 507 and the second camera 505, as a result of the optical element 501, to view a forward facing field of view 509. According to some embodiments, when the device 500 is placed in the case, an optical element 501 (e.g., a mirror or prism) may be placed proximate to or in an optical path from the second camera 505. The first camera 503 may receive light from a first field of view 507 (e.g., a downward field of view). The first field of view may, for example, be the same field of view of the first camera 503 when the device 500 is not inside the case. In some embodiments, the optical element 501 may receive light from a second field of view 509 and convey the light to the second camera 505. In this manner the second camera 505 may view the second field of view 509 or a part(s) of a the second field of view 509 if the field of view is partially redirected as shown in FIG. 3 for a single camera device.

Figure 6:
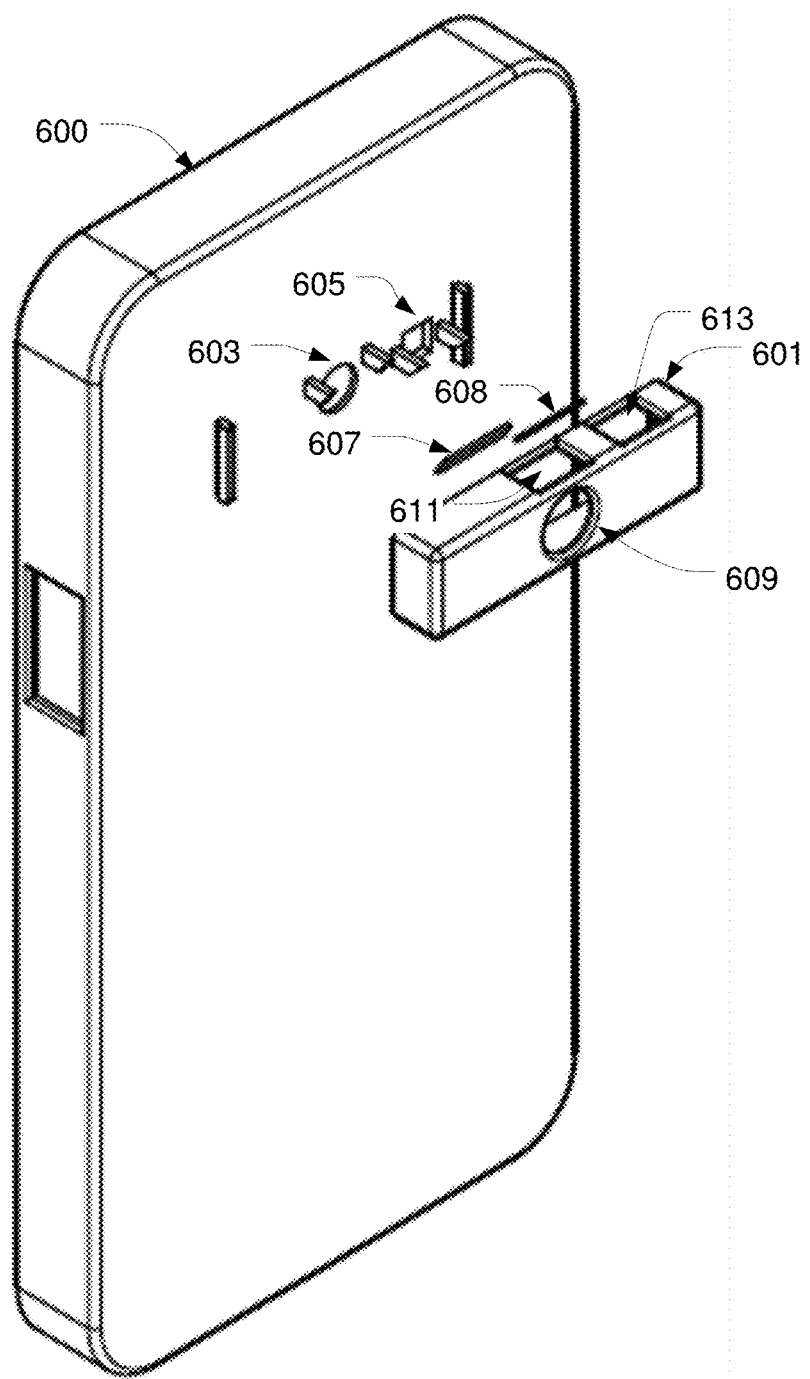
FIG. 6 is an illustration of example components of a mobile device case according to some embodiments.

FIG. 6 illustrates example components of a mobile device case of some embodiments (e.g., mobile device case 100). The mobile device case may include a first portion 600 (e.g., a first housing) shaped to hold or enclose at least a part of a mobile device. The mobile device case may further include a second portion 601 (e.g., a second housing) that houses or covers optical elements 607, 608. The second portion 601 may include openings 609, 611, 613 through which light may travel. Although the first portion 600 and second portion 601 are shown separately in FIG. 6, it should be appreciated that they are shown separately for purposes of illustration. According to some embodiments, the portions 600, 601 may be formed as a single piece to form a housing of the mobile device case. In other embodiments, the portions 600, 601 may comprise physically separate components that may be joined to form the mobile device case. For example the second housing 601 may be configured to snap fit onto the first housing 600.

In some embodiments, the mobile device case may include a first housing or attachment 603 for a first optical element 607 (e.g., a mirror or prism). The first optical element 607 may, for example, correspond to optical element 101 discussed above with respect to FIGS. 1A-C and serve to redirect light to form a second field of view for a camera of the phone. Additionally, the mobile device case may include a second housing or attachment 605 for a second optical element 608 (e.g., a lens, mirror, and/or prism). The second optical element 608 may be a part of an aimer optic for generating an aimer light pattern as discussed above with respect to FIG. 1. In some embodiments, the optical elements may be housed and attached inside the second portion 601. The second portion 601 may include structures which attach the optical elements to the second portion 601 of the case. According to some embodiments, an optical element may be attached to a corresponding attachment mechanism by attaching to support structures of the mechanism. Embodiments are not limited to using a specific form of attachment. For example, the optical element may be attached to support structures with an adhesive. Additionally or alternative, the attachment mechanism may include grooves or slots into which the optical element may fit. The grooves or slots may fasten the optical element to the case.

In some embodiments, the second portion 601 may include a first opening 609 on a first surface of the housing through which light may enter and a second opening 611 on a second surface of the housing through which light may enter. The first and second openings 609, 611 may, for example, correspond to first and second openings 105 and 107 discussed above with respect to FIG. 1. According to some embodiments, light may enter the first opening 609 and reach a camera of a device placed in the case. For example, the light may enter the first opening 609 and directly reach a first portion of the camera. This opening may provide the camera with a field of view similar to the field of view of the camera when the device is not placed in the case. In some embodiments, the first optical element 607 attached to the case via the first mechanism 603 may be arranged to convey light received from the second opening 611 to the camera of the device. For example, the first optical element 607 may convey (e.g., redirect or reflect) light received from the second opening 611 to a second portion of the camera. The light conveyed to the camera may allow the camera to view a forward facing field of view (e.g., for scanning a bar code). In this manner, the two openings 609, 611 and the first optical element 607 may enable the camera to simultaneously view two separate fields of view.

In some embodiments, the second portion 601 may further include a third opening 613 on the first surface. The third opening 613 may allow for aimer optics to project a light pattern generated from a light source (e.g., flash) of a device placed in the mobile device case. In some embodiments, the second optical element 608 attached to the case via the second attachment mechanism 605 can receive light from the light source. The second optical element 609 may modify the light received from the light source such as by magnifying the light, blocking portions of the light, and/or causing the light to change color as it passes through the second optical element 608. According to some embodiments, the second optical element 608 may further direct the generated aimer light pattern through the third opening 613 of portion 601. For example, a user may point the device placed in the case using the aimer light pattern projected from the third opening 613 to aim the device and/or capture an image of a specific target or location.

Although FIG. 6 illustrates an embodiment showing two optical elements and corresponding openings. In some embodiments, the case may not be configured to generate an aimer light pattern. Accordingly, the second portion 601 may not include a third opening 613 for an aimer light pattern. Further, the case may not include a second attachment mechanism nor an aimer optic 608. In some embodiments, the case may have four or more openings. In some embodiments with a fourth opening, light from a light source of the mobile device (e.g., the flash) may be split between the third and fourth openings. According to one embodiment, part of the light may be directed through the third opening as described above, to generate the aimer light pattern, while another part of the light may be directed through a fourth opening in a direction generally toward another field of view, such as a downward field of view. For example, in some embodiments light from the flash may be directed through the third opening to generate the aimer light pattern while light from the flash may be directed through the fourth opening to serve as a flash and provide light to brighten images captured using the downward field of view. The flash directed for the downward field of view may allow for the mobile device camera to capture images similar to how the mobile device camera would do so when outside of the case. In other embodiments, additional aimer optics may be provided for the fourth opening, to create an aimer light pattern for the downward field of view.

FIG. 6 illustrated an exploded view of a case in accordance with some embodiments. FIGS. 7A-C illustrate different views of the mobile device case of FIG. 6 as assembled, including with a device disposed therein. FIGS. 7A-C illustrate a first portion 701 in which the mobile device is placed and a second portion 703 holding the optical elements. As discussed above with respect to FIG. 6, the second portion 703 includes a first opening 705 through which light may reach a device camera directly. The second portion 703 further includes a second opening 707 through which light may enter. As described above, according to some embodiments, an optical element (e.g., first optical element 607) may convey light entering the second opening 707 to the device camera allowing it to view multiple views. In some embodiments, the second portion 703 may further include another opening 709 through which light can be projected from a light source of the mobile device. For example, an aimer light pattern formed by an optical element (e.g., second optical element 608) using light received from a flash or LED light source of the mobile device can be projected from the opening 709.

In some embodiments, each of the first and second openings 705, 707 may be sized, shaped, and positioned to guide light to the device camera. For example, the second opening 707 may be sized and shaped to ensure that light from one or more desired directions enters the opening 707 and reaches the optical element (e.g., first optical element 607). FIGS. 7A and 7C illustrate the optical element 711 (e.g., element 607, or element 101 of FIG. 1) disposed within the housing 703. FIG. 7C, in particular, illustrates the element 711 blocking a portion of the field of view of the camera 713, from the field of view facing a surface of the device on which the camera is disposed (e.g., the back surface of the device). The position of the element 711, as appreciated from the foregoing and from the axonometric view of FIG. 7A, allows for the camera 713 to view a second field of view via element 711 and opening 707. By appropriately sizing and shaping the opening 707, the device camera can have a targeted field of view (e.g., forward field of view). Further, the size and shape of the opening may prevent light from directions that may, for example, distort a desired field of view from reaching the device camera.

In some embodiments, the third opening 709 may be sized, shaped, and positioned such that light can be projected from the third opening 709. For example, the third opening 709 can be set such that an aimer light pattern may project from the third opening 709. The opening 709 may, for example, assist in preventing projected light from spreading in other directions.

FIGS. 8A-C illustrate different views of a portion of a mobile device case that houses one or more optical elements, in accordance with the embodiment of FIG. 6. As described above, in some embodiments, the portion 810 may house a first optical element 821 for redirecting light received through an opening of the portion to a device camera. In some embodiments, the portion 810 may house a second optical element 823 for redirecting a light source of the device (e.g., LED that may serve as a flash).

FIG. 8A illustrates a perspective view of the portion 810. In some embodiments, the housing may include support structures for holding the one or more optical elements. For example, as shown in FIG. 8A, the case portion 810 includes positioning structures 811, 813 for holding an optical element (e.g., a mirror). In some embodiments, the case portion 810 may include separate support structures for each optical element housed in the case portion 810. Although a triangular support structure is shown in FIG. 8A, note that any suitable method and/or structure of holding the optical element(s) in place may be used as embodiments are not limited in this respect. In some embodiments, the optical elements may be attached to a different portion of the case (e.g., first portion 600). The portion 810 may, in these embodiments, not include a support structure but may include positioning structures for fitting the portion 810 onto another portion of the case. For example, structures 811, 813 may comprise guide structures for fitting the portion 810 onto another portion of the case where an optical element is attached.

FIG. 8B illustrates a side a view of the case portion 810 showing a placement of optical elements 821, 823 inside the case portion 810. In some embodiments, the first optical element 821 may be formed and positioned to convey light received from an opening of the case portion 810 to a device camera. For example, the optical element 821 may comprise a mirror or prism that is positioned to deflect light received from the opening to the device camera. In some embodiments, the second optical element 823 may be formed and positioned to redirect light received from a camera light source. In one example, the optical element 823 may include a lens that generates an aimer optic and redirects the aimer optic through an opening of the portion 810.

FIG. 8C illustrates a back view of the portion 810 illustrating the holes in the case portion and placement of optical element support structures, according to some embodiments. The inventors have appreciated that the location, size, and shape of each opening may be modified for different types of mobile devices. For example, a configuration of openings for an iPhone may be different than the configuration of openings for a Galaxy Note mobile device. Likewise, the optical elements and associated support structures may be modified for different types of devices as embodiments are not limited in this respect.

FIGS. 9A-B illustrate side views of a mobile device case 901 with optical elements 905, 907 attached to the case, according to some embodiments. FIG. 9B shows a zoomed-in portion of FIG. 9A, designated "A" in FIG. 9A. Optical elements 905, 907 may be attached at a location 903 on the case 901. The location 903 of each of the optical elements may be modified on the case 901 such that the optical elements may align with target portions of the mobile device. For example, a case for an iPhone 8 may have a different location 903 than that of a Samsung Galaxy Note 7. Further, as shown in FIG. 9B, each optical element may be positioned to allow the camera to view multiple fields of view. For example, optical element 907 may correspond to an optical element for allowing a device camera to view a forward field of view. Accordingly, the optical element 907 may be sized, shaped, and positioned to redirect light to provide the forward field of view. For example, the optical element 907 may comprise a mirror or prism that receives light coming through an opening in a top surface of the case (e.g., opening 611 in FIG. 6) and redirects the light to the device camera. Further, optical element 905 may be used for generating an aimer light pattern. Optical element 905 may be sized, shaped, and positioned to receive light from a light source of the mobile device, modify the light source, and redirect the light source through an opening to project the aimer optic.

Figure 10:
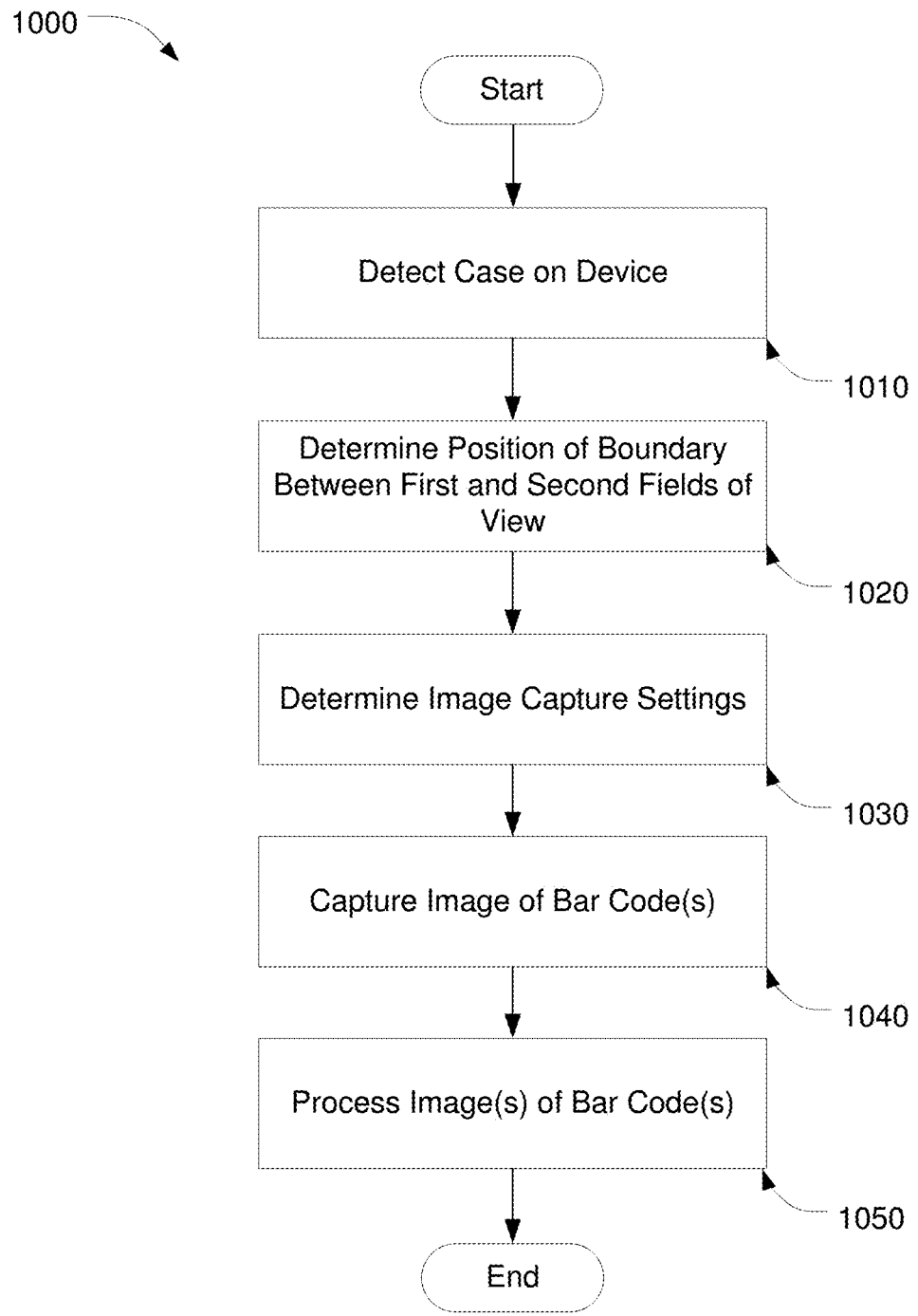
FIG. 10 is a flowchart of an example process that may be implemented in some embodiments for reading a bar code.

FIG. 10 illustrates an example process 1000 for reading a bar code that may be implemented in some embodiments. In some embodiments, some of the elements of FIG. 10 may relate to, or be implemented using, techniques described in connection with FIGS. 11-20.

Process 1000 may be performed by a mobile device such as mobile device 110 placed in case 100 of FIG. 1. For example, one or more facilities executing on a mobile device 110, which may be or form a part of one or more applications executing on the mobile device 110, may perform the process 1000. A user may place the mobile device 110 in the case 100 and use the mobile device 110 to read a bar code. The user may point a field of view (e.g., forward field of view 107) of the mobile device at a bar code image to read the bar code.

The process 1000 may begin at step 1010, in which a case detection facility detects whether a case has been placed on the device. The case detection facility may be placed inside a case, the case may be wrapped or attached to the mobile device, or a case may be put on or attached to the mobile device in another suitable manner, as embodiments are not limited in this respect. The determination by the case detection facility can be used to intelligently enable and/or disable functionalities of one or more other facilities or applications, which may help in using computational and power resources efficiently in some embodiments. For example, when the case detection facility detects that the mobile device is placed in a multi-view case (e.g., case 100), the case detection facility may trigger one or more other facilities or applications to present a user interface that enables a user to selectively capture images from one of the fields of view, and/or enable the facilities/applications to use different capture parameters (e.g., exposure parameters) to capture images in the different fields of view. When the case detection facility detects that the mobile device is not in a multi-view case, such functionality may not be presented to a user or may be disabled.

According to some embodiments, the case detection facility may detect whether the case has been placed on the device using one or more of the techniques described below in FIGS. 11-17. In some embodiments, the facility may use mobile device sensors to determine whether the case has been placed on the device. The mobile device sensors may include the mobile device camera, a light sensor, an accelerometer, a gyroscope, and other sensors of the mobile device. For example, the facility may use image information captured by the camera to determine optical flow or orientation in images received by the camera. In another example, the facility may use a light sensor to determine whether the mobile device is in the case. In yet another example, the facility may use a motion sensor(s) such as an accelerometer or gyroscope to determine whether the mobile device is in the case.

After detecting that a case has been placed on the mobile device process 1000 proceeds to step 1020 in which a boundary detection facility determines a position of a boundary between two fields of view in a received image(s). According to some embodiments, the facility may identify the portions of the camera's view that correspond to different fields of view by identifying a boundary between image information captured from multiple different views. For example, the facility may determine a position in a received image at which to split the received image. Such a boundary, once identified, could be used to effectively display the multiple fields of view in a display of the mobile device or otherwise process image data captured from the different fields of view. Further, the location of the boundary may inform the mobile device which field of view corresponds to specific tasks or functions (e.g., bar code scanning). The mobile device may then direct particular processing and functionality to a portion of an image based on the location of the boundary in the image.

After determining a position of the image split, process 1000 proceeds to step 1030 where a capture setting facility determines image capture parameters (e.g., exposure settings and/or focus settings). As described above, when the mobile device is placed in a case of some embodiments, a mobile device camera simultaneously views multiple fields of view. When a camera is able to view and/or capture images in multiple fields of view at once, the focus point in different fields of view may be different, or the lighting in different fields of view may be different, or circumstances between the fields of view may otherwise vary. Accordingly, the facility may set image capture parameters for each field of view differently for the mobile device to effectively perform functions associated with each field of view. According to some embodiments, the image capture parameters may include exposure settings and/or focus settings of the device camera.

Exposure settings may comprise an amount of light that an image sensor of a mobile device camera captures when an image is received or captured. Too much light may result in a washed out photo (e.g., overexposed photo) whereas too little light may result in a photo that is too dark (e.g., underexposed). In some embodiments, it may be helpful, for effectively reading bar codes in captured images, to capture the images as quickly as possible while reducing the chances of overexposure. The camera's exposure settings may be controlled by a plurality of parameters. The plurality of parameters may include shutter speed, light sensitivity (e.g., ISO setting), and/or aperture. According to some embodiments, the facility may set image capture parameters for a field of view to increase chances that a bar code in that field of view can be scanned successfully (e.g., the data encoded therein correctly retrieved). Accordingly, the facility may set exposure (e.g., shutter speed, ISO setting, and/or aperture) to capture the bar code image to ensure that the mobile device can read the bar code.

Shutter speed may control how long a camera shutter remains open to expose the camera's image sensor to light. By lowering the amount of time that the shutter remains open, the camera may be able to capture an image quickly, which may enable capturing a clear image of a fast moving object at a point in time. By keeping the shutter open for a longer period of time, the image may show movement of a fast moving object, or slower-moving objects as the time period increases. A mobile device may not have a mechanical shutter, but may have a similar concept by regulating a time period over which pixel values detected by the camera are integrated to generate a combined image. Over a longer period of time, more light is received, and when that light is combined into one image, motion during that period of time a result in a ghost effect or blur in the image. According to some embodiments, the capture setting facility may set the "shutter" speed to aggregate pixel values for a minimum amount of time that allows the mobile device to read a bar code. The facility may also set the shutter speed to a value that reduces the likelihood of blur of the bar code while still allowing enough light to reach the image sensor for the mobile device to receive a bar code image that can be scanned.

ISO settings may affect a sensitivity of the camera's image sensor to light. The capture setting facility may adjust the ISO setting such that more or less light corresponds to different numeric values for detected light. A higher ISO setting may increase the image sensor's sensitivity to light, meaning that less light will result in a higher pixel value, while a lower ISO setting may decrease the image sensor's sensitivity to light. For example, an ISO setting that is too high may result in a received image or portions of a received image that are too bright, or that includes a large amount of "noise" pixel values that could potentially distort the content of the image or prevent or negatively impact proper processing of the content (e.g., bar code scanning). On the other hand, an ISO setting that is too low may result in a received image or portions of a received image that are too dark to be processed properly. According to some embodiments, the capture setting facility, when scanning a bar code, may set the ISO settings to a value that allows the mobile device to receive images of a bar code that are sufficiently bright to read the bar code.

Aperture may comprise a setting for controlling a size of a lens opening that allows light into the camera. For example, the aperture may be controlled to blur or focus portions of images received by the mobile device: the lens may be opened to sharpen a particular subject in a field of view and the lens may be closed to sharpen the entire contents of the field of view. Not all mobile devices may have a controllable aperture. However, in embodiments in which a mobile device has a controllable aperture, the capture setting facility may set the aperture to capture a sufficiently sharp image of the bar code to allow the mobile device to read the bar code. For example, the facility may set the aperture to a value that allows an application to analyze a received image to properly read a bar code (e.g., a 1D or 2D pattern).

According to some embodiments, the image capture parameters may also include focus settings of the camera. Focus settings may include focal length and/or focus range. According to some embodiments, the capture setting facility may determine the focal length and/or focus range. The facility may, for example, determine the focus settings to read or scan a bar code. In some embodiments, the facility may determine focus settings based on a particular portion of a field of view. For example, the facility may determine a point or region at which focus control is applied programmatically, which may be done using autofocus techniques or other focusing techniques. The point or region may be determined programmatically and/or through input via a user interface. The facility may, for example, determine a focal length and/or a focus range to ensure that a minimum sharpness is met for the portion of the field of view. In some embodiments, the facility may determine focus settings to properly read a bar code. For example, the facility may determine focus settings such that an entire bar code is captured in an image with a sharpness sufficient to distinguish different parts of the bar code (e.g., different lines, different blocks) and enable accurate processing of the bar code.

Although embodiments discussed herein reference example image capture parameters (e.g., ISO, shutter speed, aperture, focal length), embodiments are not limited to those of image capture parameters discussed herein. Techniques disclosed herein may be adapted with other image capture parameters, as embodiments are not limited in this respect.

After determining image capture settings at step 1030, process 1000 proceeds to step 1040 where a scanning facility captures an image of a bar code(s). The scanning facility may capture the bar code in a forward field of view of the device camera with the camera image capture parameters (e.g., exposure settings, focus settings) set to ensure that a readable image of the bar code is captured. An example process for setting image capture parameters settings is described below with reference to FIG. 20. The scanning facility may capture the image of the bar code to reduce likelihood of blur of the bar code such that the mobile device may properly read the bar code. In some embodiments, the scanning facility may identify a bar code based on a determined location of the boundary between the multiple fields of view. The scanning facility may search for a bar code in a portion of the images relative to the location of the boundary. For example, the facility may scan for bar codes above the location of the boundary as the portion of the image may comprise the forward field of view.

Next, process 1000 proceeds to step 1050 where the scanning facility processes the image of the bar code. According to some embodiments, the scanning facility may include an application that may process an image of the bar code. The scanning facility may use any suitable technique for reading the bar code image as embodiments are not limited in this respect. The scanning facility may process the bar code to identify a particular number or other identification represented by the bar code. The facility may present a result of the bar code scanning to a user. For example, the facility may include an application that generates a user interface that presents a user with a result of the bar code. The scanning facility may indicate to a user that the bar code was successfully scanned. The scanning facility may further store the information read from the bar code in a data store, or use that information in any suitable manner. For example, another facility with which the scanning facility is affiliated may be configured to perform a query based on an identifier extracted from a bar code, or take other suitable action based on the information encoded in the bar code.

According to some embodiments, scanning a bar code (i.e., capturing an image of the bar code and/or processing the bar code image) may be triggered automatically. The scanning facility may automatically detect a presence of a bar code in a field of view and initiate scanning of the bar code, by analyzing images captured over time and looking for content in the images (e.g., patterns) that match expected patterns for a bar code. In response to finding such a pattern, the scanning facility may scan the bar code and retrieve information encoded therein. In some embodiments, the scanning facility may be affiliated with a user interface that allows a user to trigger a bar code scan. For example, the scanning facility (or an application with which the scanning facility is a part, or with which it communicates) may have a user interface by which a user may trigger a bar code scan, such as by pressing a physical button (e.g., a volume button of the mobile device, or other button) or by pressing a soft button on a display screen (e.g., a touch screen button). In some embodiments, the scanning facility may trigger reading of the bar code responsive to a hardware input of the mobile device. For example, the scanning facility may be configured to read a bar code responsive to a button of the mobile device being pushed (e.g., volume up/down button). In some embodiments, the reading of a bar code may be triggered by a voice command. For example, the mobile device may recognize a particular word or utterance which triggers reading of the bar code. In some embodiments, the reading of the bar code may be triggered by another system connected wirelessly to the device. For example, another device connected to the device via Bluetooth may be configured to trigger readings of the bar code. The scanning facility may receive a command or instruction from the connected device that triggers the mobile device to read the bar code.

In some embodiments, different inputs may be provided for triggering capture of a bar code in different fields of view. For example, one button of the user interface may cause the scanning facility to analyze image data for a first field of view for a bar code, while another button may cause the scanning facility to analyze image data for a second field of view. In other embodiments, an input mechanism (e.g., button) may be trigger analysis of image data for multiple fields of view. This may be because, in some embodiments, it is unlikely that bar codes may appear simultaneously in different fields of view. Accordingly, there may not be ambiguity over which bar code a user intended to scan, because there may be only one bar code visible within any of the fields of view at a time. In still other embodiments, the scanning facility may analyze image data for all fields of view in response to an input, and subsequently process each of the bar codes (if multiple) found within the fields of view.

Figure 11:
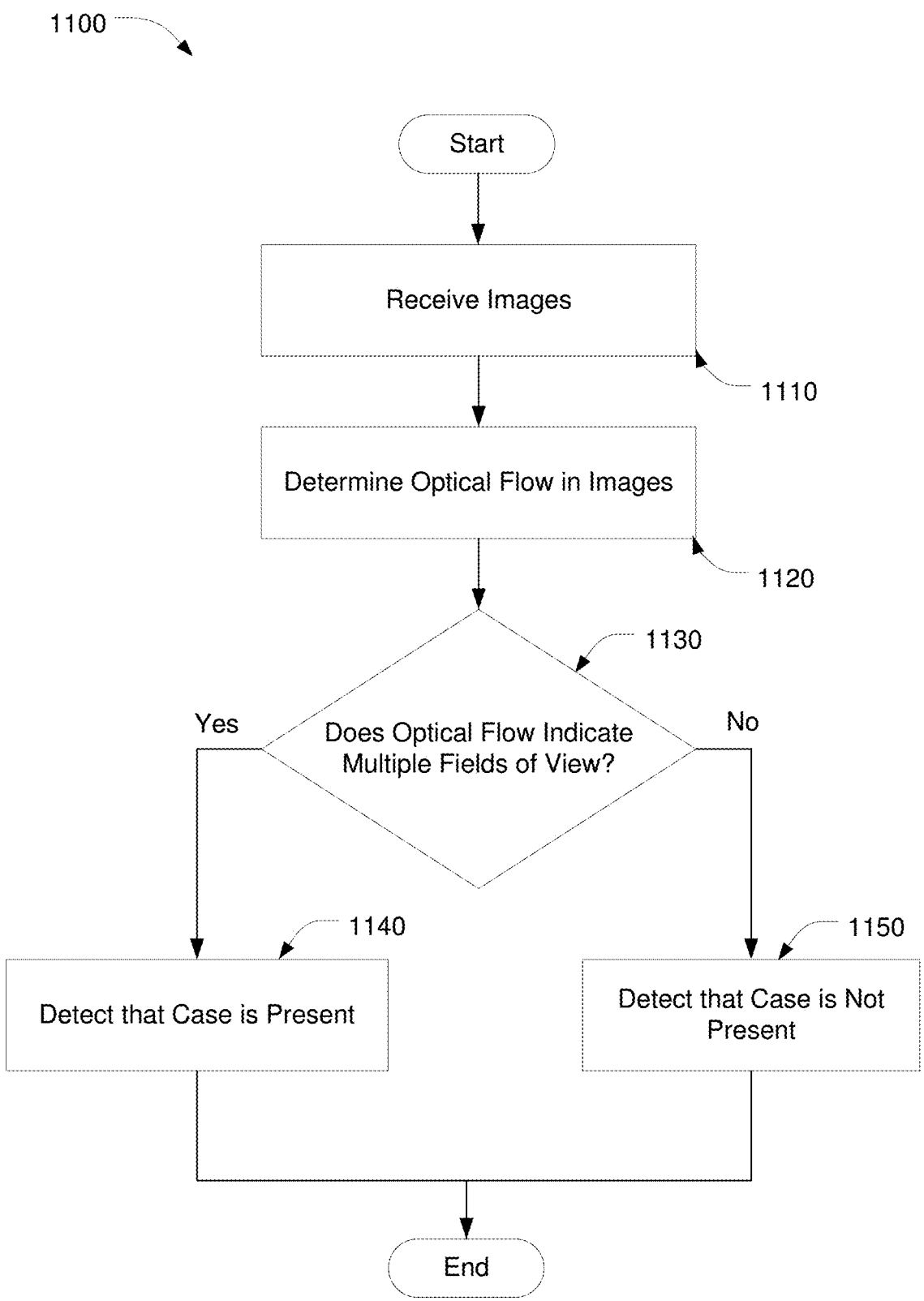
FIG. 11 is a flowchart of an example process that may be implemented in some embodiments for determining whether a mobile device is in a case, and/or for identifying such a case, by analyzing optical flow of an image received by the mobile device.

FIG. 11 illustrates a process 1100 for detecting whether a case is present based on an optical flow of an image. The process of FIG. 11 may be implemented by a case detection facility executing on a mobile device in some embodiments. Optical flow includes the nature of motion in a sequence of images captured by a camera of the mobile device, caused by movement in a field of view of a camera and/or movement of the camera itself. Optical flow may be determined for an object, edge, or surface within the image, and may include direction and/or magnitude (e.g., a gradient) of motion for such an object/edge/surface. For example, the optical flow may indicate motion of an object in the field of view across multiple image frames viewed by the camera.

In some embodiments, to determine optical flow, the case detection facility may identify one or more points in a first image frame of a sequence of image frames. For example, the facility may identify the one or more points in the first frame as a pattern of pixel intensity values (e.g. RGB values for one or more pixels). The case detection facility may then identify the same points in subsequent image frames. The facility may identify the same pattern of pixel intensity values across the subsequent image frames. The case detection facility may then determine a direction and/or magnitude of movement of the points between the first frame and the subsequent frames. For example, the facility may calculate a vector that indicates the direction and magnitude of movement of the points between the first image frame and subsequent image frames. The vector may, for example, comprise a velocity of movement of the points across the image sequence. In another example, the facility may determine a direction as an angle of motion of the points across the image sequence.

In another example, the case detection facility may identify a location of an object in a first image frame. The object can be any object visible to the camera such as a car, ball, or other object. The case detection facility may, for example, identify pixels in the image at which the object is located. The case detection facility may then identify the location of the same object in a second image frame. The case detection facility may then determine whether the object moved in a certain direction (e.g., up, down, left, right). The facility may also determine how far the object moved between the first image frame and the second image frame (e.g., 100 pixels to the right).

In some embodiments, the case detection facility may determining whether, when a mobile device moves, there is different optical flow in different portions of the same sequence of images. The mobile device may perform process 1100 to determine whether a case is present (e.g., placed on the mobile device, attached to the mobile device) and, whether a particular type of case is present. Accordingly, in some embodiments, the process 1100 may be performed to detect presence of one or more specific types of cases that allow one or more cameras of the mobile device to simultaneously view multiple fields of view (e.g., case 100).

According to some embodiments, the case detection facility may store a predetermined optical flow(s) associated with presence of a case. For example, the case detection facility may be configured with a predetermined optical flow(s) that indicates a presence of a case, or different optical flow values for different types of cases. The case detection facility may store a direction and/or magnitude of optical flow expected for one or more mobile device movements across a sequence of image frames when the mobile device is placed inside a case. The facility can determine whether a case is present based on the predetermined optical flow value. In some embodiments, the predetermined optical flow value(s) may be determined by experimentation. In some embodiments, the facility may determine and store an optical flow(s) for when the mobile device is not placed inside a case. A subsequent measured optical flow can be compared to the stored optical flow value to determine whether the difference between a current and stored optical flow indicates presence of a case.

Process 1100 begins at step 1110 where the case detection facility receives a sequence of images. In some embodiments, a camera of the mobile device may acquire image information over time, generating the sequence of images. The camera may comprise a digital camera. Light from an area viewed by the camera may travel through a lens of the camera and make contact with an image sensor of the camera. The image sensor may measure the intensity and color of the light that travels through the lens. The image sensor may, for example, comprise a semiconductor chip containing a number (e.g., millions) of light sensitive pixels each of which individually measures the light striking the pixel. Each of the pixels in the image sensor may generate an analog electrical signal (e.g., a current) based on the light intensity and/or color of light that reaches the signal. The measurements made by the image sensor may be converted into a digital signal. For example, an analog to digital converter may convert the electrical signal generated by each pixel into a digital value. The digital signals may further be processed to generate the images.

Next, at step 1120, the case detection facility determines an optical flow in the images captured by the camera. As described above, the facility may determine the optical flow by determining motion of one or more objects across multiple image frames. The case detection facility may determine a gradient of pixel values across image frames to quantify an optical flow value. In some embodiments, the facility may further utilize motion sensors of the mobile device (e.g., accelerometer, gyroscope) to determine that the mobile device is moving and determine an optical flow relative to the measured movement of the mobile device. The facility may read a measurement of a motion sensor to determine whether the mobile device is moving. In response to detecting that the mobile device is moving, the facility may determine the movement of one or more points across multiple image frames. For example, the facility may identify an object in a first image frame and then identify its location in subsequent image frames. The facility may then use the change in location of the object across the image frames to identify a direction of movement across the image frames and/or a magnitude of the movement across the image frames. In one example, the facility may identify an object in a first frame based on a pattern of pixel intensity values (e.g. RGB values for one or more pixels). The facility may track the movement of the object across a sequence of image frames by identifying the same pattern of pixel intensity values across the sequence of image frames.

In some embodiments, the facility may determine optical flow in different portions of the images, and/or whether there is different optical flow in different portions of the images. The application may determine a first optical flow for a first portion of the received images and a second optical flow for the second portion of the received images. The "portion" may correspond to a same fixed part of the images, such as a same grouping of pixels across each of the images. In some embodiments, the first and second portions may correspond to expected positions of first and second fields of view that the camera can view as a result of the mobile device being placed in a case (e.g., case 100). When the mobile device is not placed within the case that allows the camera to simultaneously view multiple fields of view, the first and second optical flows may be the same. For example, when the mobile device is not placed within the case, the direction and/or magnitude of movement for one or more points across a sequence of image frames may match a stored direction and/or magnitude.

In some embodiments, the facility may determine optical flow further based on sensed motion of the mobile device. For example, the facility may correlate a particular optical flow (e.g., pixel gradient) to a motion of the device. The change in motion may include a specific acceleration or speed, or may include a direction of movement of the mobile device. The facility may determine an optical flow in the received image relative to the movement. In some embodiments, the facility may detect the optical flow as a direction of movement in image(s) viewed by the camera.

Next, process 1100 proceeds to step 1130 where the case detection facility determines whether the optical flow indicates that the received image includes multiple fields of view. In some embodiments, the facility determines whether a determined optical flow corresponds to an optical flow expected when the image(s) includes multiple fields of view. For example, the facility may compare a determined optical flow to a stored optical flow expected when the image includes multiple fields of view. The facility may compare a determined direction and/or magnitude of movement for one or more points in a sequence of image frames to a stored direction and/or magnitude of movement. In another embodiment, the facility may determine that the determined optical flow differs from an optical flow expected when the images include a single field of view. For example, the application may compare a determined optical flow to a stored expected optical flow. The facility may determine whether determined direction and/or magnitude of motion of an object across a sequence of images differs from a stored expected direction and/or magnitude.

In another embodiment, if the optical flow in two separate portions of the received image is different, the facility may determine that there are multiple fields of view present in the received image(s). In one embodiment, the facility may determine whether measured optical flows differ enough between the two portions of the image to indicate a presence of multiple fields of view. For example, if a user is holding device 110 in case 100 as shown in FIG. 1A in an upward direction, the optical flow in each of the two field of views may differ. In another example, the facility may determine a direction of movement in the two separate portions of the received image. If each portion has a different direction of movement in the image for a motion of the mobile device, this may indicate presence of multiple fields of view. For example, the forward field of view 107 may receive an inverted image. Accordingly, when the mobile device is moved, the apparent direction of object movement in the image will be different in the forward field of view 107 than in the downward field of view 105.

In some embodiments, the case detection facility may determine whether there is no optical flow in a portion of the image to determine whether there are multiple fields of view in the received image(s). For example, when the mobile device is placed in a case that allows the mobile device to view multiple fields of view, the received images may include a region (e.g., row(s) of pixels) where no light is received as a result of the optical element (e.g., a mirror edge) blocking a portion of the camera view. The facility may determine the optical flow in this specific region of the image. For example, the facility may determine that a set of black pixels in the region of a first image frame remain in that region in a subsequent sequence of images. If the facility determines that there is no optical flow in the region, the facility may determine that there are multiple fields of view as a result of an optical element being present. In contrast, if no case is present, the facility may detect optical flow in the specific region of the image.

In some embodiments, the case detection facility may determine optical flow in the received images relative to a detected movement of the mobile device. The facility may determine a particular acceleration value or direction of movement of the device based on measurements provided by a movement sensor (e.g., accelerometer or gyroscope). The facility may then analyze a corresponding optical flow in the received image(s). In some embodiments, the facility may determine whether the optical flow in different portions of the received image(s) are different relative to movement of the mobile device. For example, the facility may compare pixel gradients resulting from mobile device movement in each portion of the image and determine whether the gradients are different. The facility may determine, for each portion, a direction and/or magnitude of movement of an object across a sequence of images. If the gradients are different (e.g., direction and/or magnitude differ), the mobile device may determine that the image(s) include multiple fields of view.

If the mobile device determines that the optical flow indicates that multiple fields of view are present in the received image(s) 1130, the facility proceeds to step 1140 in which the facility determines that a split-view case is present. Upon determining that the split-view case is present, process 1100 ends. After detecting that the case is present, the case detection facility (e.g., an application on the mobile device that includes case detection functionality) may configure mobile device hardware and software to view and capture images including multiple fields of view. In some embodiments, the facility may trigger modification of image capture settings to capture of images in each of the multiple fields of view. For example, an application parameter setting facility may set image capture parameters for each field of view as described below with respect to FIG. 20.

In some embodiments, upon detecting that the case is present, an application executing on the mobile device may generate a user interface showing each field of view separately. For example, as shown in FIG. 2C, one portion 233 of the user interface display a first field of view and a second portion 231 of the user interface may display a second field of view. In some embodiments, upon detection of a case at step 1130, the case detection facility may trigger activation of features associated with bar code reading. For example, the application may initiate generation of an aimer light pattern using a light source (e.g., flash or LED) of the mobile device. Further, the application may set image capture parameters for one field of view to read barcodes. In some embodiments, the case detection facility may trigger launching of one or more other applications responsive to detecting that the case is present. For example, launching a bar code reading application in response to detecting that the case is present.

If, at step 1130, the facility determines that the optical flow indicates that the received image(s) does not include multiple fields of view 1130, the case detection facility proceeds to step 1150 where the mobile device detects that the case is not present. In this case, the mobile device and/or applications executing on the mobile device may be left or changed to a configuration of the mobile device without a case. For example, the facility may trigger setting of image capture parameters to default settings of the mobile device. If the mobile device was previously in a state in which the case was present, the facility, upon detecting that the case is not present at 1150, may trigger deactivation or disabling of functionality (e.g., software, hardware) associated with multi-view image capturing.

Figure 12:
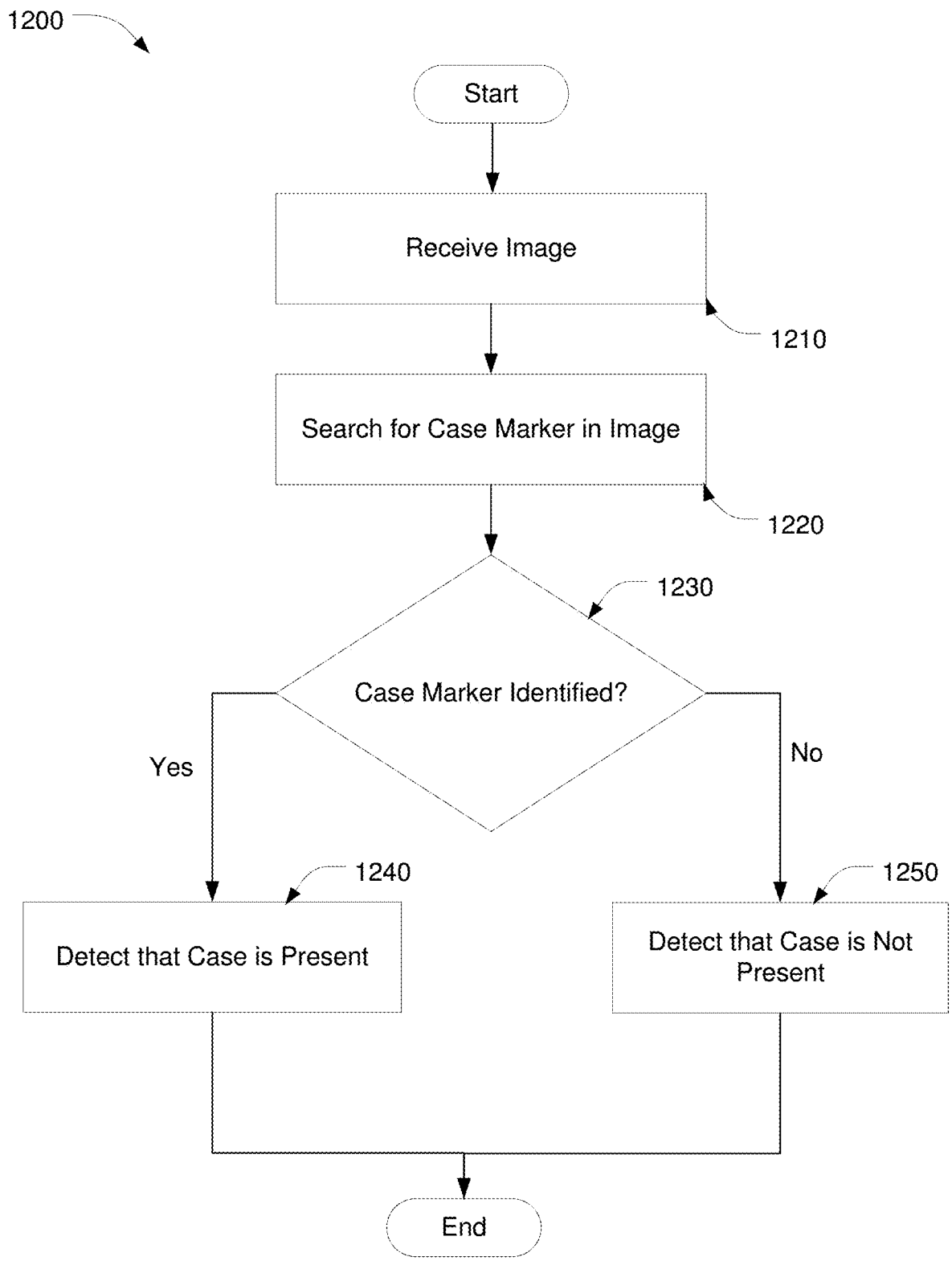
FIG. 12 is a flowchart of an example process that may be implemented in some embodiments for determining whether a mobile device is in a case using a case marker.

FIG. 12 illustrates a process 1200 for detecting whether a case is present on a mobile device based on a case marker associated with the case. A case marker may be a portion of the case, visible to a device camera, that indicates presence of a case. For example, the case marker may be a specific color, pattern, and/or shape of a portion of the case that can be identified or viewed by the device camera when the mobile device is placed in the case. A case detection facility executing on a mobile device may perform process 1200 to determine whether any case is present (e.g., placed on the mobile device, attached to the mobile device). In some embodiments, the case detection facility may perform the process 1200 to detect a presence of one or more specific types of cases that allow one or more cameras of the mobile device to simultaneously view multiple fields of view (e.g., case 100).

Process 1200 begins at step 1210 in which the mobile device receives an image(s). The mobile device may receive the image(s) as described above in step 1110 with reference to FIG. 11. Next, process 1200 proceeds to step 1220 where the facility detects whether a case marker is present in the received image(s). In some embodiments, the facility may perform image processing to detect a presence of a particular case marker. The facility may search for the case marker at a particular location within the received image(s). For example, the facility may analyze pixel locations in an image where the case marker is expected to be present to determine whether pixel values in that location match particular pixel values indicating that the case marker is present. The facility may, for example, search for a particular color and/or pixel intensity pattern in a region of the received image(s). In some embodiments, the facility may perform object recognition to identify a specific marker in the image.

Next, process 1200 proceeds to step 1230 where the case detection facility determines whether a case marker is identified. If the facility determines that the case marker was identified in the received image(s) 1230, the facility proceeds to step 1240 where the facility determines that the case is present. In this case, the facility may trigger configuring the mobile device according to the detected case, including enabling functionality and features associated with the detected case. For example, as described above with respect to FIG. 11, the facility may trigger configuration of the camera to view multiple fields of view, and/or read bar codes in one of the multiple fields of views. In another example, the facility may initiate use of an aimer optic to generate a pattern using a light source of the mobile device. Although case-specific features are discussed herein with respect to a case that enables the camera to view multiple fields of view, features of various cases may be enabled, as embodiments are not limited in this respect.

If, at step 1230, the facility determines that the case marker is not identified in the received image(s) 1230, the facility proceeds to act 1250 where the facility determines that there is no case present. In this case, the mobile device may be left or changed to a configuration of the mobile device without a case. For example, the facility may trigger setting of image capture parameters to default settings of the mobile device. If the mobile device was previously in a state in which the case was determined to be present, the facility, upon detecting that the case is not present at 1250, may trigger deactivating or disabling of functionality (e.g., software, hardware) associated with multi view image capturing.

Figure 13:
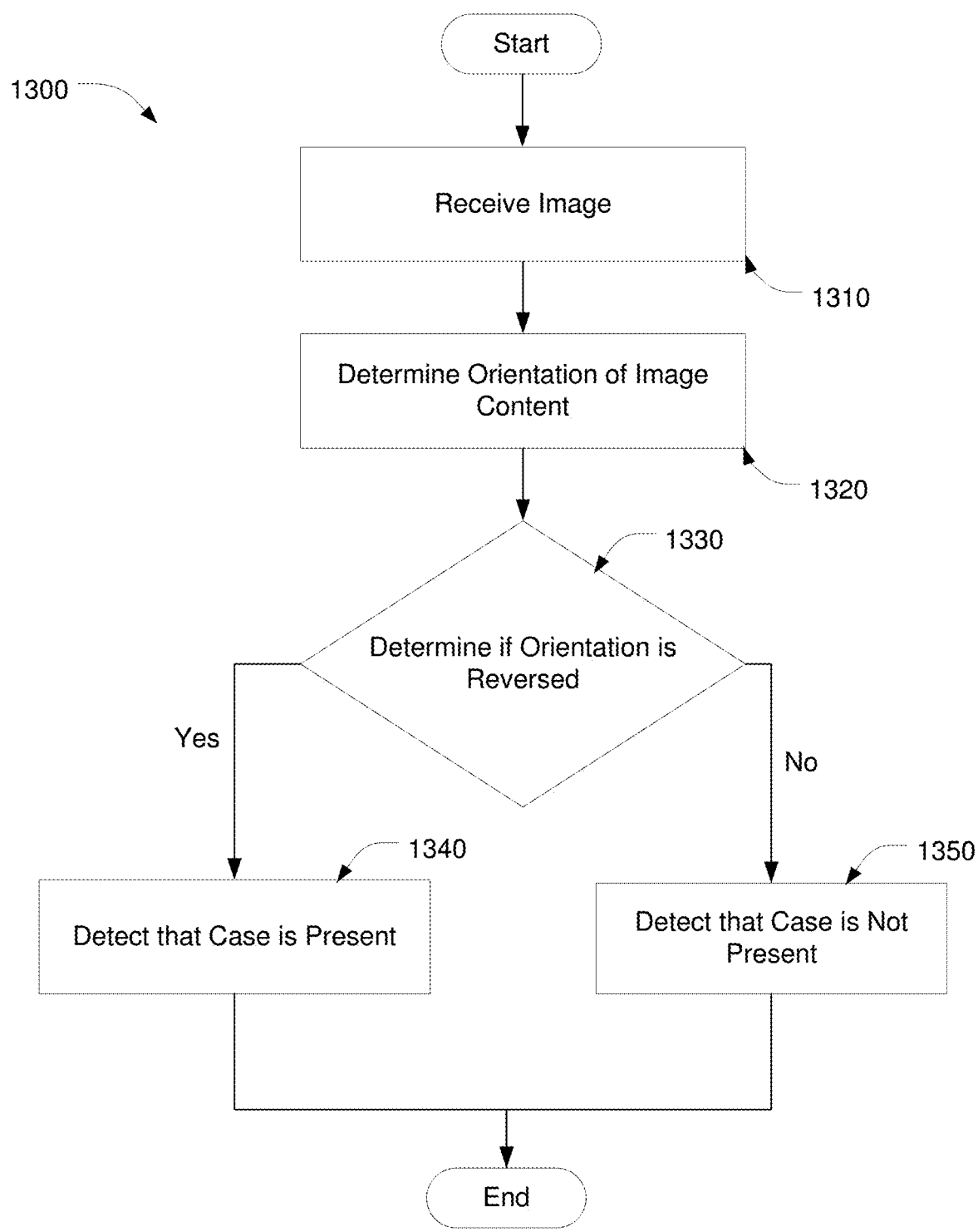
FIG. 13 is a flowchart of an example process that may be implemented in some embodiments for determining whether a mobile device is in a case by analyzing an image of a bar code captured by a camera of the mobile device.

FIG. 13 illustrates a process 1300 for detecting whether a case is present on a mobile device based on orientation of content in a received image(s). An orientation of content received in the received image(s) may be altered if the case allows the camera to view multiple fields of view using an optical element. Accordingly, a case detection facility may perform process 1300 to determine whether any case is present (e.g., placed on the mobile device, attached to the mobile device). In some embodiments, the process 1300 may be performed to detect a presence of one or more specific types of cases that allow one or more cameras of the mobile device to simultaneously view multiple fields of view (e.g., case 100).

Process 1300 begins at step 1310 in which the case detection facility receives an image(s). The facility may receive the image(s) as described above with respect to FIG. 11. Next, process 1300 proceeds to step 1320 where the case detection facility determines an orientation of image content. In some embodiments, the case detection facility may analyze the received image(s) to determine the orientation of image content. When the mobile device is placed inside a case of some embodiments described herein (e.g., case 100), the received image(s) may include multiple fields of view. An optical element that conveys light from one field of view to the camera may, in the process of conveying the light, invert the image. For example, the optical element may comprise a mirror that deflects light from a field of view to the camera. The deflection may result in an inversion of the image content. The facility may analyze the image to identify the orientation. For example, the application may identify text beneath a 1D bar code and determine that it is inverted. In some embodiments, the facility may use optical character recognition systems and techniques for identifying text and determining orientation of the text.

Next process 1300 proceeds to step 1330 where the case detection facility determines whether the orientation is reversed. The facility may determine whether the orientation determined at step 1320 is reversed relative to image content in received images when the mobile device is not placed in a case. For example, the facility may determine whether text recognized in the image content is reversed. A bar code in a forward facing view of the camera may include numbers beneath the bar code. The facility may identify whether those numbers are reversed using optical character recognition techniques.

If, at step 1330, the case detection facility determines that the content of the received image(s) is reversed 1330, the facility proceeds to step 1340 where the facility determines that the case is present. In this case, the facility may trigger configuring the mobile device according to the detected case. The facility may enable functionality and features associated with the detected case. For example, as described above with respect to FIG. 11, the facility may trigger configuring of the camera to view multiple fields of view, and/or read bar codes in one of the multiple fields of views. In another example, the facility may initiate use of an aimer optic to generate a light pattern using a light source of the mobile device. Although case specific features are discussed herein with respect to a case that enables the camera to view multiple fields of view, features of any case may be enabled as embodiments are not limited in this respect.

If, at step 1330, the facility determines that the orientation of image content is not reversed 1330, the facility proceeds to act 1350 where the facility determines that there is no case present. In this scenario, the mobile device and/or applications executing on the mobile device may be left or changed to a configuration of the mobile device without a case. For example, the facility may trigger setting of image capture parameters to default settings of the mobile device. If the mobile device was previously in a state in which the case was determined to be present, the facility, upon detecting that the case is not present at 1350, may trigger deactivating or disabling of functionality (e.g., software, hardware) associated with multi view image capturing.

Figure 14:
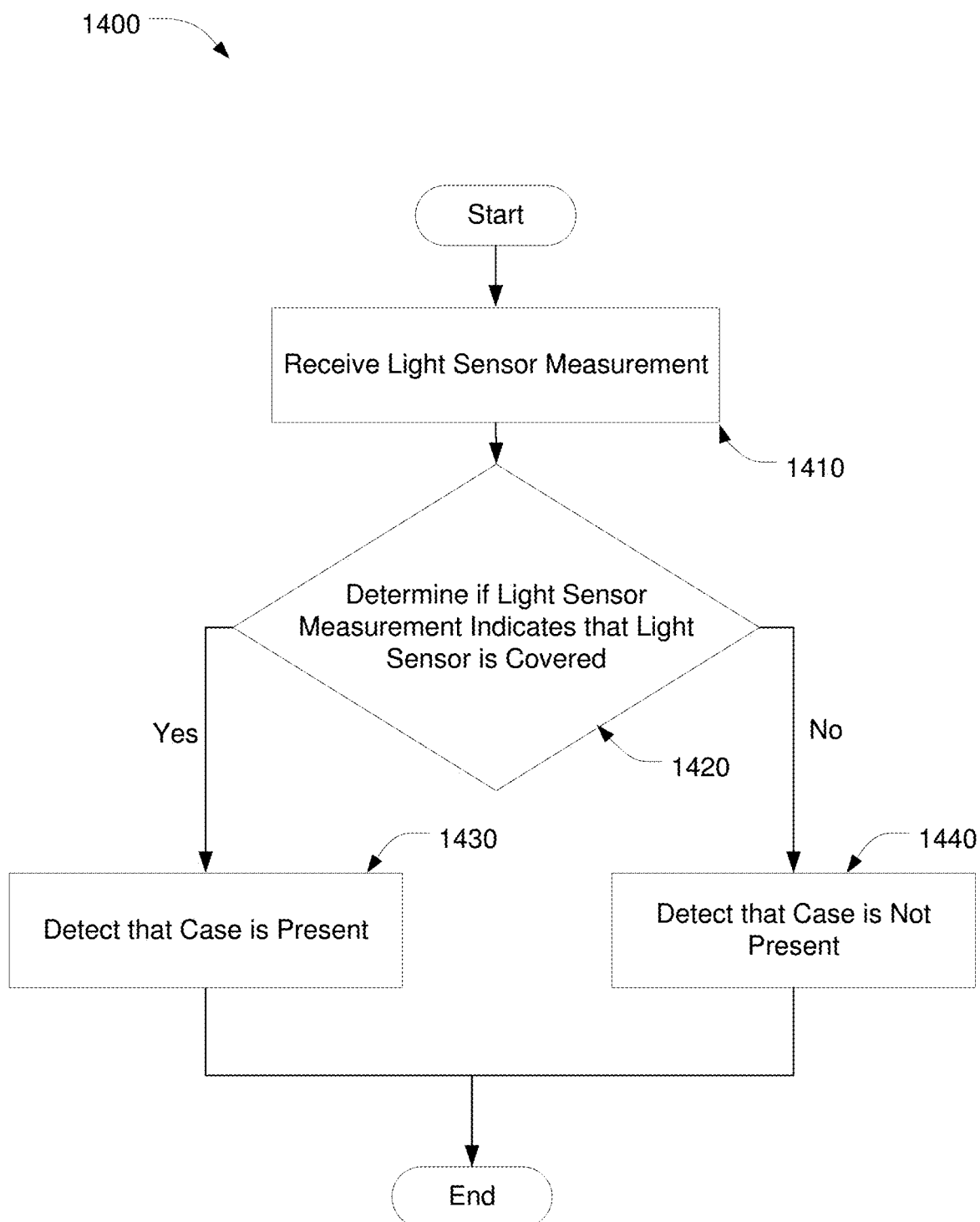
FIG. 14 is a flowchart of an example process that may be implemented in some embodiments for determining whether a mobile device is in a case using a sensor of the mobile device.

Mobile devices (e.g., smartphones and tablets) often include ambient light sensors that measure ambient light levels. FIG. 14 illustrates a process 1400 for detecting whether a case is present on a mobile device based on a measurement of a light sensor measurement of a mobile device. The device case detection facility may perform process 1400 to determine whether any case is present (e.g., placed on the mobile device, attached to the mobile device). In some embodiments, the process 1400 may be performed to detect a presence of one or more specific types of cases that allow one or more cameras of the mobile device to simultaneously view multiple fields of view (e.g., case 100).

Process 1400 begins at step 1410 where the case detection facility receives a light sensor measurement. The light sensor may include an electrical circuit that generates an electrical signal based on an intensity of light that hits the sensor. For example, the electrical circuit may include a photoresistor or phototransistor via which a light sensitive electrical signal is generated. The electrical signal may be converted to a digital value that can be used as an indicator of the light intensity. The facility may access light intensity measurements of the light sensor.

Next, process 1400 proceeds to step 1420 where the case detection facility determines if the light sensor measurement indicates that the sensor is covered. In some embodiments, when the light sensor is covered, the light sensor may output a low light intensity. When the light sensor is not covered, the light sensor may output a higher light intensity than when the light sensor is covered. According to some embodiments, when a mobile device is placed in a case, the case (e.g., case 100) may cover all or a portion of the light sensor of the mobile device. Thus, the facility may determine whether the light sensor is covered based on the light intensity value received from the light sensor.

If, at step 1420, the case detection facility determines that the light sensor is covered 1420, the facility proceeds to step 1430 where the facility determines that the case is present. In this case, the facility may trigger configuring of the mobile device according to the detected case. The facility may trigger enabling of functionality and features associated with the detected case. For example, as described above with respect to FIG. 11, the facility may trigger configuring of the camera to view multiple fields of view, and/or read bar codes in one of the multiple fields of views. In another example, the facility may trigger use of a light pattern generated using a light source of the mobile device. Although case specific features are discussed herein with respect to a case that enables the camera to view multiple fields of view, features of any case may be enabled as embodiments are not limited in this respect.

If, at step 1420, the case detection facility determines that the light sensor is not covered 1420, the facility proceeds to act 1440 where the facility determines that there is no case present. In this case, the mobile device and/or applications executing on the mobile device may be left or changed to a configuration of the mobile device without a case. For example, the facility may trigger setting of image capture parameters to default settings of the mobile device. If the mobile device was previously in a state in which the case was determined to be present, the facility, upon detecting that the case is not present at 1440, may trigger deactivation or disabling of functionality (e.g., software, hardware) associated with multi view image capturing.

Although process 1400 is described with respect to a light sensor of the mobile device, other sensors of the mobile device, including the camera, may be used to detect the presence of a case. In some embodiments, the case detection facility may determine a light intensity for one or more pixels of an image. The mobile device being placed in a case (e.g., case 100) may result in a portion of the viewing area of the camera being covered by a portion of the case. This may result in blocking light or reduction of light intensity in some pixels of the received image(s). Accordingly, the facility may use pixel intensity values of those pixels to determine whether the mobile device is placed in the case. For example, the case detection facility may determine whether the specific one or more pixel intensity values indicate that a portion of the camera is covered and thus the mobile device is placed in the case.

Figure 15:
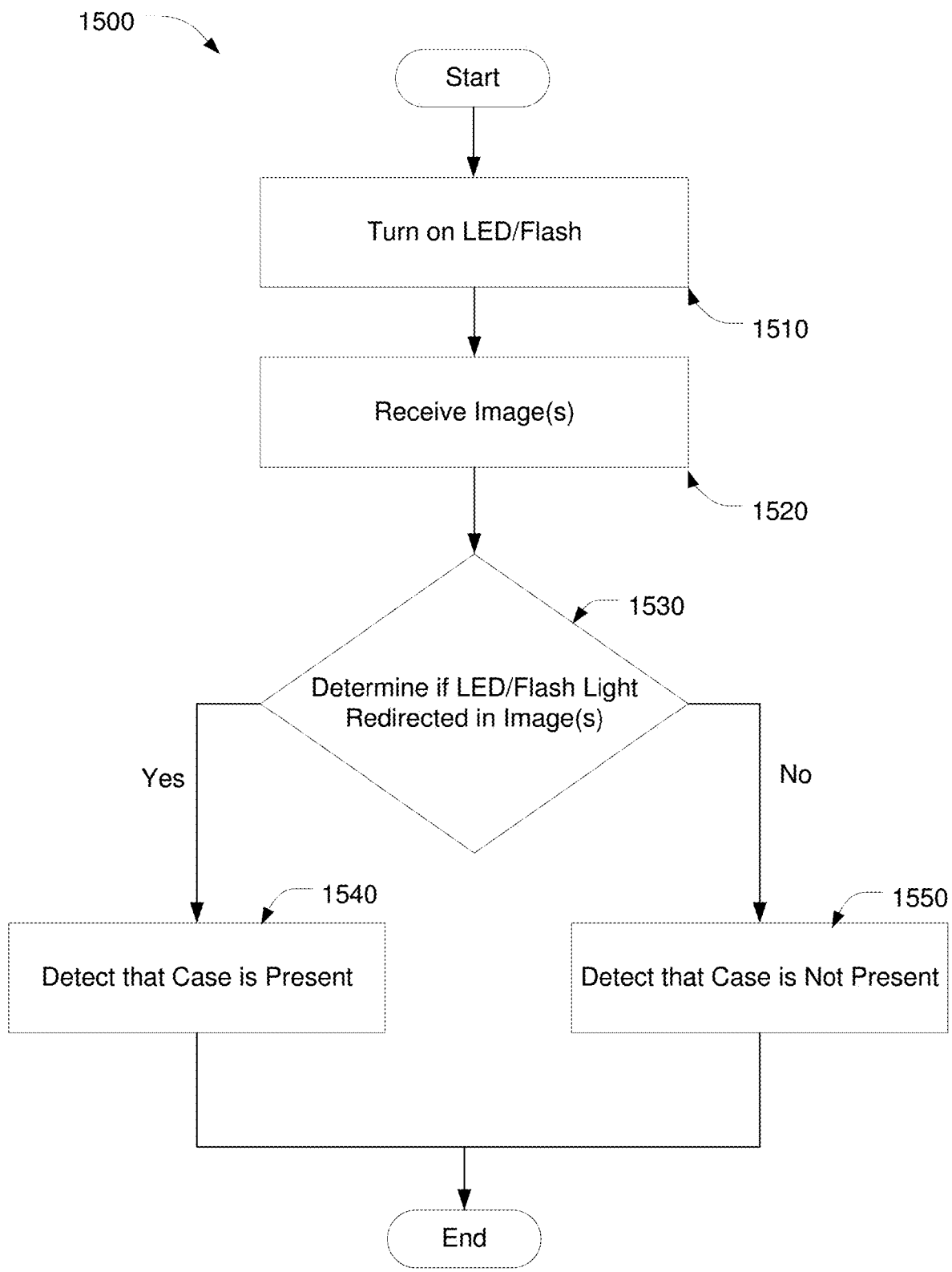
FIG. 15 is a flowchart of an example process that may be implemented in some embodiments for determining whether a mobile device is in a case using a sensor of the mobile device.

According to some embodiments, a case (e.g., case 100) may include an optical element that redirects some light from the light source to the camera. For example, the optical element may comprise one or more mirrors that direct a portion of the device camera flash to the camera. FIG. 15 illustrates a process 1500 for detecting whether a case is present on a mobile device based on a redirection of light from the light source. The device case detection facility may perform process 1500 to determine whether any case is present (e.g., placed on the mobile device, attached to the mobile device). In some embodiments, the process 1500 may be performed to detect a presence of one or more specific types of cases that allow one or more cameras of the mobile device to simultaneously view multiple fields of view (e.g., case 100).

In some embodiments, the case may direct light from the light source to specific locations in an image. For example, an optical element in the case may deflect light from the flash or LED of the mobile device to specific locations of the camera image sensor which result in specific pixels of images being affected by the deflected light. In some embodiments, the case detection facility may store locations and/or expected pixel values for when the light is deflected to the camera. For example, specific pixels may have high light intensity values when the mobile device is placed in the phone. Thus, the locations of those pixels and/or the high light intensity values may be stored for determination of case presence.

Process 1500 begins at step 1510 where the case detection facility turns on a light source of the mobile device. The facility may, for example, access device camera control to turn on the light source of the device. Next, process 1500 proceeds to act 1520 in which the facility receives an image(s). The facility may receive the image(s) as described in step 1110 above in reference to FIG. 11.

Next, process 1500 proceeds to step 1530 where the case detection facility may determine if light from the light source has been redirected to the mobile device camera. In one example, the facility may determine whether light from an LED or flash of the mobile device has been redirected to the camera. As described above, the case may be configured to redirect light from the light source to specific locations (e.g., specific pixels) in the received image(s). The facility may analyze the received image(s) to determine whether light from the light source has been redirected. In some embodiments, the facility may determine a light intensity value(s) at specific locations (e.g., specific pixels) within the received image(s) and compare determined value(s) to an expected value(s) for when there is a case present. In some embodiments, the facility may determine whether the light intensity values exceed a threshold. If the facility determines that the light intensity value(s) does exceed the threshold, the facility may determine that the case is present. Otherwise, the facility may determine that the case is not present. In another embodiment, the facility may determine whether the light intensity for a threshold number of pixels exceeds a threshold value or is within a threshold range of the expected values. If the facility determines that a threshold number of pixels have light intensity values that do exceed the threshold, the facility may determine that the case is present. Otherwise, the facility may determine that the case is not present.

If at step 1530 it is determined that light from the light source has been redirected 1530, the case detection facility proceeds to act 1540 in which the facility determines that a case is present. In this case, the facility may trigger configuring of the mobile device according to the detected case as described above with respect to FIG. 11. The facility may trigger enabling of functionality and features associated with the detected case. For example, the facility may trigger configuring of the camera to view multiple fields of view, and/or read bar codes in one of the multiple fields of views. In another example, the facility may trigger use of a light pattern generated using a light source of the mobile device. Although case specific features are discussed herein with respect to a case that enables the camera to view multiple fields of view, features of any case may be enabled as embodiments are not limited in this respect.

If, at step 1530, the case detection facility determines that light from the light sensor has not been redirected to the camera 1530, the facility proceeds to act 1550 where the facility determines that there is not case present. In this step, the facility may leave the mobile device and/or applications executing on the mobile device unchanged or trigger changing to a configuration of the mobile device without a case. For example, the facility may trigger setting of image capture parameters to default settings of the mobile device. If the mobile device was previously in a state in which the case was determined to be present, the facility, upon detecting that the case is not present at 1550, may trigger deactivation or disabling of functionality (e.g., software, hardware) associated with multi view image capturing.

Figure 16:
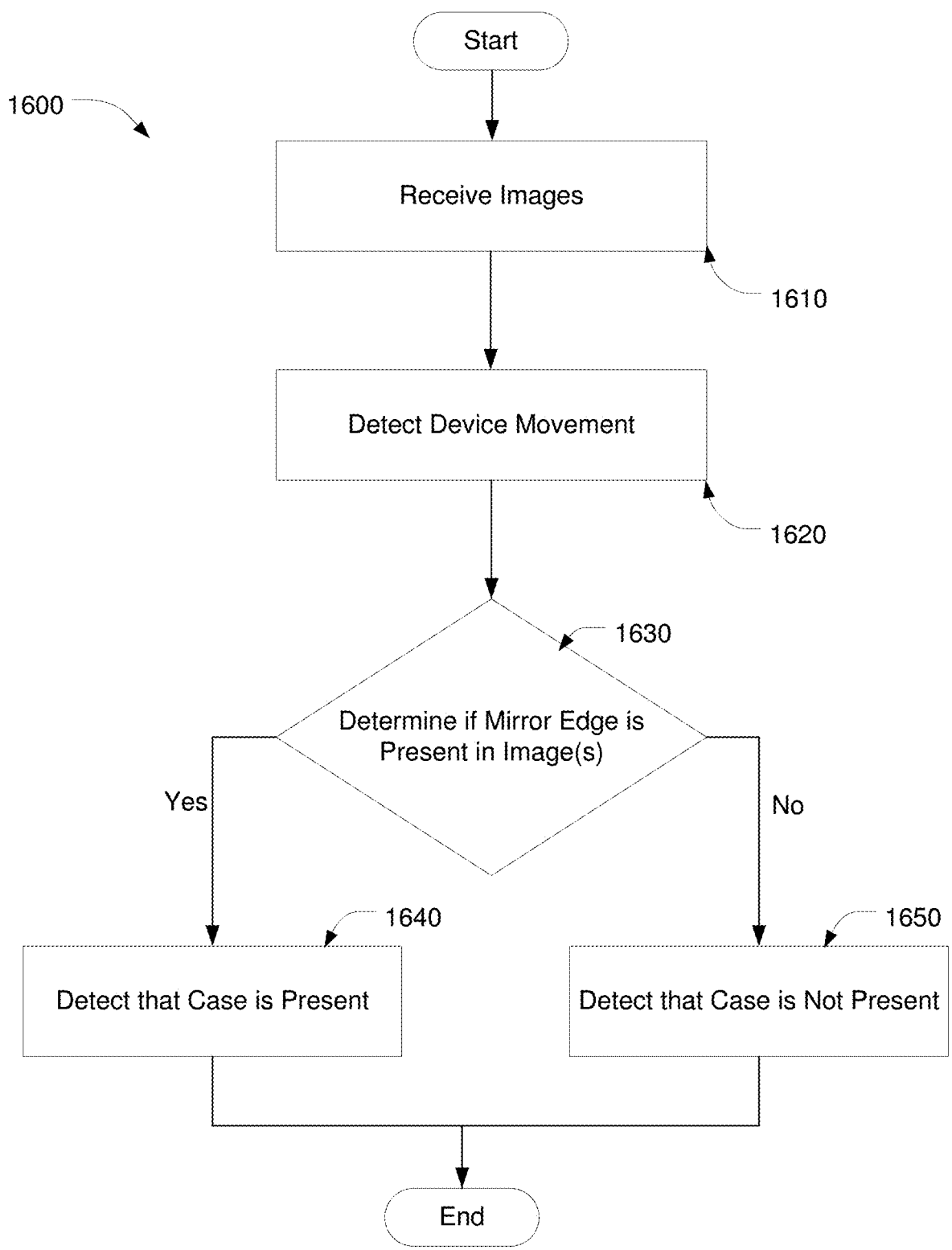
FIG. 16 is a flowchart of an example process that may be implemented in some embodiments for determining whether a mobile device is in a case based on device movement.

As described above, a case (e.g., case 100) may include an optical element such as a mirror. A portion of the optical element, such as an edge of the mirror, may be present in images received by the mobile device. FIG. 16 illustrates a process 1600 for detecting whether the case is present on a mobile device based on a presence of a mirror edge in images received by the mobile device. A case detection facility may perform process 1600 to determine whether any case is present (e.g., placed on the mobile device, attached to the mobile device). In some embodiments, the process 1600 may be performed to detect a presence of one or more specific types of cases that allow one or more cameras of the mobile device to simultaneously view multiple fields of view (e.g., case 100). Although techniques discussed herein may describe detecting a presence of an edge of a mirror, the techniques are not limited in this respect as the techniques may be used to detect any portion of an optical element.

Process 1600 begins at step 1610 where the case detection facility receives an image(s). The facility may receive the image(s) as described above in step 1110 in reference to FIG. 11. Next, process 1600 proceeds to step 1620 where the facility detects device movement. In some embodiments, the facility may access various sensor measurements to determine whether the mobile device has moved. For example, the facility may access accelerometer measurements to determine whether the mobile device is in motion. For example, an acceleration above a threshold level may indicate sufficient movement for the case detection facility to trigger determination of a presence of a mirror edge. In another example, the facility may access gyroscope measurements to determine whether the mobile device is being rotated.

Next, process 1600 proceeds to step 1630 in which the case detection facility determines whether a mirror edge is present in the received image(s). In some embodiments, the facility may determine optical flow in a location of the received image(s) where a portion of an optical element (e.g., an edge) would be present in the received image(s). The facility may calculate an optical flow in the location of the received image(s) as described above in reference to FIG. 11. If, during detected device movement, the location within the received image(s) indicates no optical flow, the facility may determine that there is a mirror edge present in the image. The portion of the image(s) where the mirror edge is present may remain covered and not receive light. As a result, this portion of the image(s) would not have any optical flow during device movement while other portions of the image(s) would. For example, if the facility determines that points in a sequence of image frames corresponding to the location of the mirror edge show no movement (e.g., not optical flow) across the sequence of image frames. Conversely, if the facility determines that there is optical flow in the portion of the image(s) (e.g., the facility determines motion of points in the image corresponding to the location of the mirror edge), the mobile device may determine that there is no mirror edge present in the image(s).

In some embodiments, the case detection facility may search for pixel values that do not change during device movement. For example, the facility may compare a sequence of images during device movement to determine whether a portion of the images remain unchanged during the movement. In some embodiments, if the facility determines that a portion of the images corresponding to a location of the mirror edge does not change, the facility may determine that the mirror edge is present in the image.

If the case detection facility determines that the mirror edge is present in the received image(s) 1630, the facility proceeds to step 1640 in which the facility determines that the case is present. In this case, the facility may trigger configuring of the mobile device according to the detected case as described above with respect to FIG. 11. The facility may trigger enabling of functionality and features associated with the detected case. For example, the facility may trigger configuring of the camera to view multiple fields of view, and/or read bar codes in one of the multiple fields of views. In another example, the facility may trigger use of a light pattern generated using a light source of the mobile device. Although case specific features are discussed herein with respect to a case that enables the camera to view multiple fields of view, features of any case may be enabled as embodiments are not limited in this respect.

If, at step 1630, the case detection facility determines that the mirror edge is not present in the received image(s) 1630, the facility proceeds to act 1650 in which the facility determines that there is no case present. In this case, the facility may leave the mobile device unchanged or trigger changing a configuration of the mobile device without a case. For example, the facility may trigger setting of image capture parameters to default settings of the mobile device. If the mobile device was previously in a state in which the case was determined to be present, the facility, upon detecting that the case is not present at 1650, may trigger deactivation or disabling of functionality (e.g., software, hardware) associated with multi view image capturing.

Figure 17:
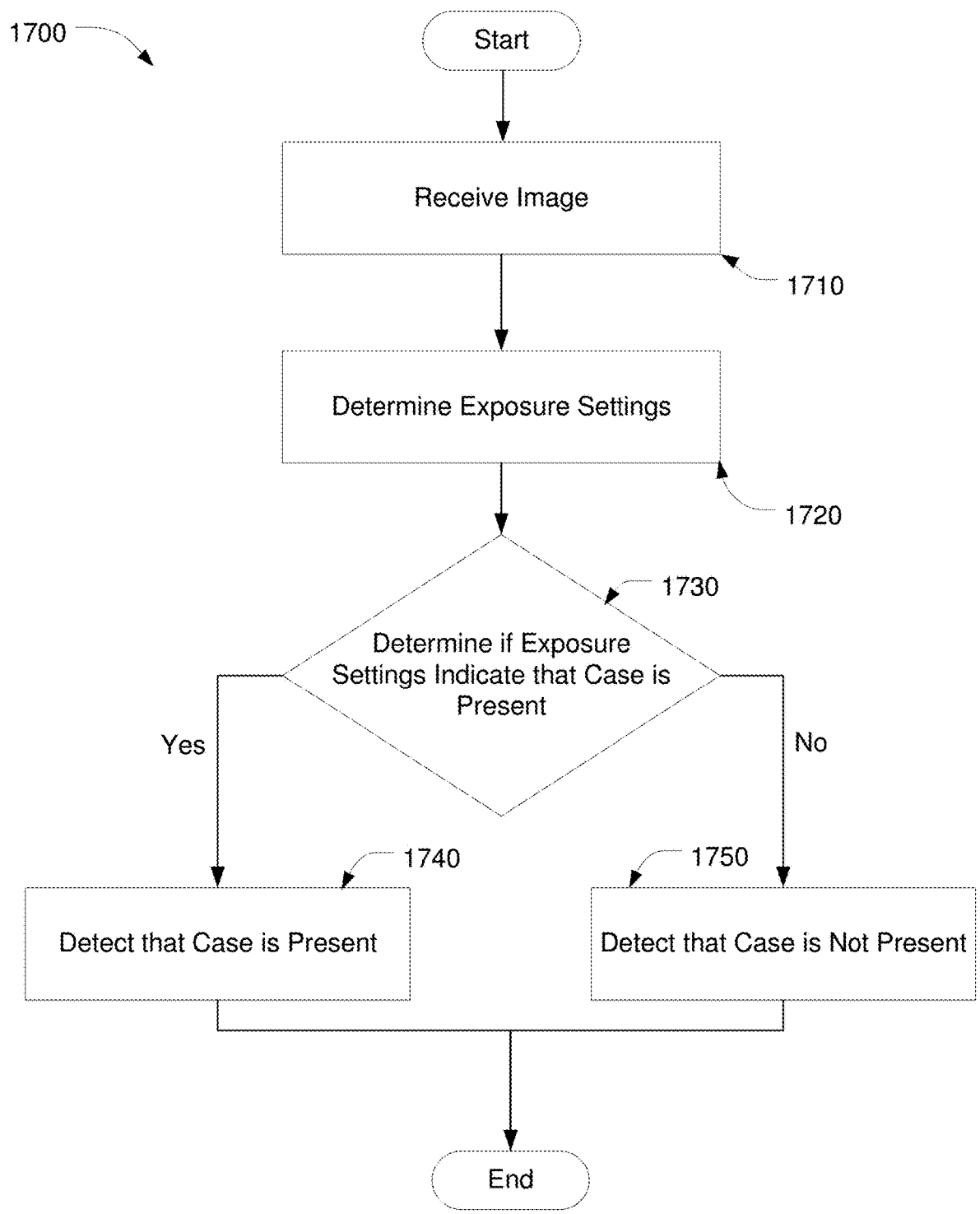
FIG. 17 is a flowchart of an example process that may be implemented in some embodiments for determining whether a mobile device is in a case based on exposure settings of a camera of the mobile device.

According to some embodiments, a case of some embodiments (e.g., case 100) allows a camera to simultaneously view multiple fields of view. A change in image capture settings (e.g., exposure settings) of the camera may indicate presence of a case. FIG. 17 illustrates a process 1700 for a case detection facility to determine whether a case is present on a mobile device based on exposure settings of a mobile device camera. In some embodiments, exposure settings may include an aperture, shutter speed, and/or light sensitivity (e.g., ISO). The facility may perform process 1700 to determine whether any case is present (e.g., placed on the mobile device, attached to the mobile device). In some embodiments, the process 1700 may be performed to detect a presence of one or more specific types of cases that allow one or more cameras of the mobile device to simultaneously view multiple fields of view (e.g., case 100).

In some embodiments, exposure settings of the mobile device camera when the mobile device is placed in the case may be determined and stored. For example, the case detection facility may store information specifying the exposure settings for when the mobile device is placed in the case. The stored settings may be used to detect whether the mobile device is placed in the case.

Process 1700 begins at step 1710 where the case detection facility receives an image(s). The case detection facility may receive the image(s) as described in step 1110 in reference to FIG. 11 above. Next, process 1700 proceeds to step 1720 where the facility determines current exposure settings. In some embodiments, the facility may monitor the exposure settings of the device camera. The facility may access the exposure settings to determine various setting values (e.g., shutter speed, aperture, sensitivity).

Next, process 1700 proceeds to step 1730 where the case detection facility detects that the exposure settings indicate that the case is present. In some embodiments, the facility may determine that the exposure settings of the camera correspond to a camera viewing multiple fields of view simultaneously and thus a case is present. For example, the facility may determine that current exposure settings match stored setting values associated with the mobile device camera viewing multiple fields of view. If the current exposure settings match the stored values, the facility may determine that the case is present. Otherwise, the facility may determine that the case is not present. For example, when the mobile device is placed inside the case, light may be directed to the camera in a different manner than when the mobile device is not inside the case. For example, the case may direct light to the camera from two separate fields of view. This may result in the automatic exposure settings of the mobile device camera to change. The case detection facility may, based on this change of settings, determine whether mobile device is placed in the case. In some embodiments, the case detection facility may compare current exposure settings to stored values that are expected when the mobile device is placed inside the case. In some embodiments, the case detection facility may determine that the mobile device is inside the case based on a change in one or more exposure setting values (e.g., shutter speed, sensitivity, aperture).

If the exposure settings indicate that the case is present 1730, the case detection facility proceeds to step 1740 where the facility determines that the case is present. In this case, the facility may trigger configuring of the mobile device according to the detected case as described above with respect to FIG. 11. The facility may trigger enabling of functionality and features associated with the detected case. For example, the facility may trigger configuring of the camera to view multiple fields of view, and/or read bar codes in one of the multiple fields of views. In another example, the facility trigger use of a light pattern generated using a light source of the mobile device. Although case specific features are discussed herein with respect to a case that enables the camera to view multiple fields of view, features of any case may be enabled as embodiments are not limited in this respect.

If, at step 1730, the case detection facility determines that the exposure settings do not indicate that the case is present 1730, the facility proceeds to act 1750 in which the facility determines that there is no case present. In this case, the facility may leave the mobile device unchanged or trigger configuring of the mobile device without a case. For example, the facility may trigger setting of image capture parameters to default settings of the mobile device. If the mobile device was previously in a state in which the case was determined to be present, the facility, upon detecting that the case is not present at 1750, may trigger deactivation or disabling of functionality (e.g., software, hardware) associated with multi view image capturing.

Figure 18:
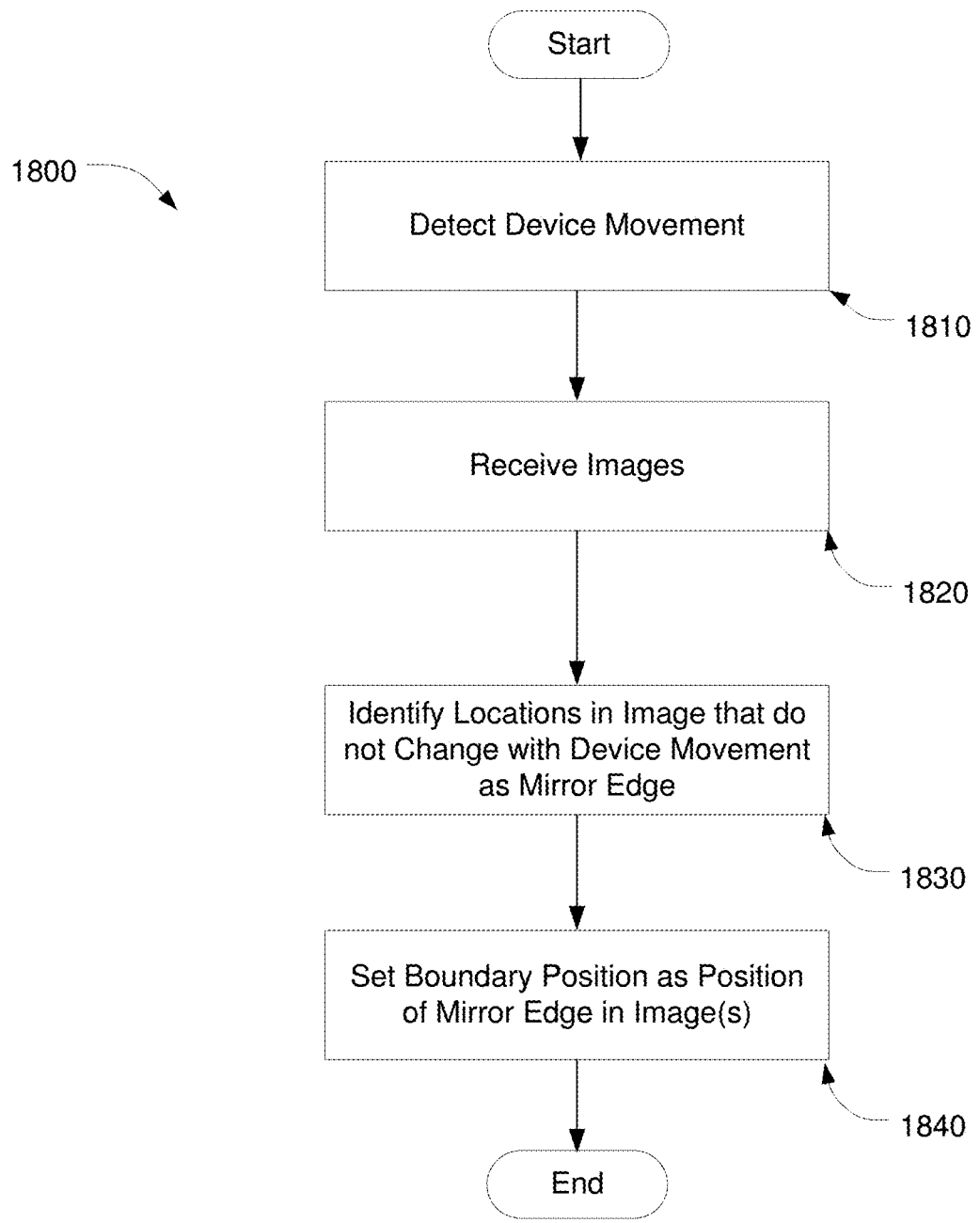
FIG. 18 is a flowchart of an example process that may be implemented in some embodiments for determining an image split position in images captured by a mobile device camera based on device movement.

As described above, in step 1020 of process 1000 described above with reference to FIG. 10, after detecting that a case has been placed on the mobile device, according to some embodiments, a boundary identification facility may identify a boundary between two different fields of view in a received image(s). FIG. 18 illustrates a process 1800 that may be performed by the boundary identification facility executing on a mobile device (e.g., mobile device 110 placed in case 100) to identify a location of the boundary between the two field of view.

Process 1800 begins at step 1810 where the boundary detection facility receives detects device movement. According to some embodiments, the mobile device use one or more sensor indications to determine whether the mobile device has moved. For example, the facility may access measurements and/or indications by an accelerometer and/or gyroscope of the mobile device to determine whether the device has moved. The facility may detect a non-zero acceleration value and/or a rotation of the device. In some embodiments, the facility may prompt a user to move the device so movement can be detected. For example, the facility may generate an alert message displayed on a user interface shown on a display of the mobile device instructing the user to move the mobile device. In some embodiments, the facility may wait for the mobile device to move without prompting the user. Next, the facility proceeds to step 1820 in which it receives multiple images as described in step 1110 in reference to FIG. 11 above.

Next, process 1800 proceeds to step 1830 where the boundary detection facility identifies one or more locations in the received images that do not change with the device movement. In some embodiments, the mobile device, when placed in a case (e.g., case 100), may have a portion of the camera blocked by an optical element of the case. For example, a mirror or prism configured to convey light to the camera may block a portion of the camera. As a result, a set of pixels of the camera image sensor may receive little or no light, which may be the pixels corresponding to an edge of the mirror. This may result in a portion of the received image(s) (e.g., a set of pixels in the received image(s)) having little or no light, or having pixel values that otherwise do not change or do not change more than a threshold amount over time. When the boundary detection facility detects movement of the mobile device, the facility may identify whether there is a location in the received images where the pixel intensity values do not change or do not change more than a threshold amount. For example, the facility may analyze a sequence of image frames associated with movement of the mobile device to determine whether there is a location in the sequence of image frames where the pixel intensity values do not change. In some embodiments, the boundary analysis facility may only be triggered to execute if it has already been determined (e.g., by a case detection facility) that the mobile device is disposed in a case that will support multiple fields of view. In such embodiments, the boundary analysis facility may thus not determine "whether" there is such a location, but may instead scan the images for that expected location in which pixel values do not change or do not change more than a threshold amount.

Next process 1800 proceeds to step 1840, where in response to finding the location in which the pixel values do not change or do not change more than a threshold amount, the boundary detection facility sets the boundary between fields of view to be the location in the received images where the pixel intensity values do not change more than a threshold amount. This location may correspond to the position of a portion of the optical element (e.g., a mirror edge) in the received images. The boundary may be utilized by the mobile device for generating a user interface to display the two fields of view, for setting image capture settings for each of the multiple fields of view, and other operations, such as illustrated above in connection with FIGS. 2A-2C.

Figure 19:
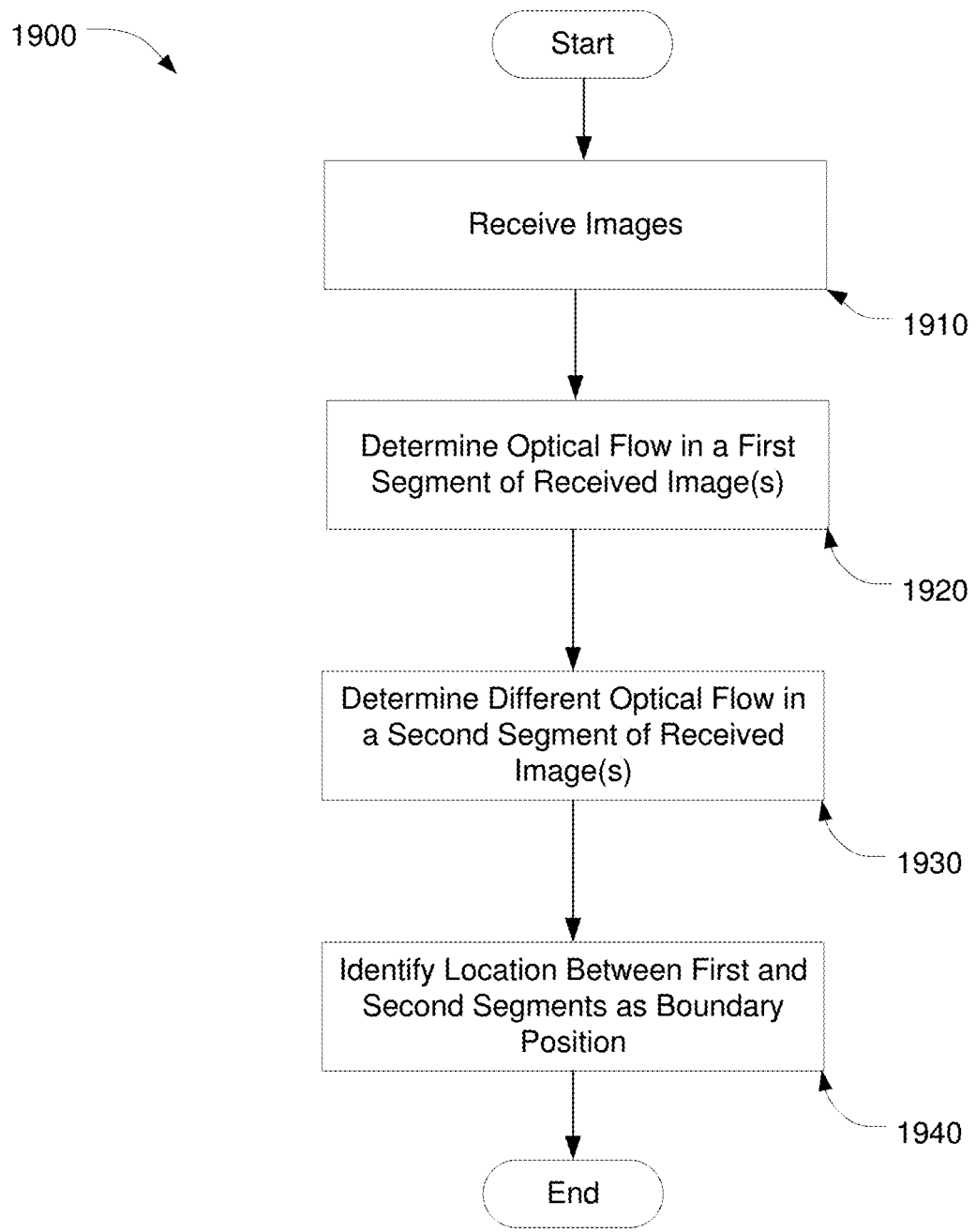
FIG. 19 is a flowchart of an example process that may be implemented in some embodiments for determining an image split position in images captured by a mobile device camera based on optical flow in images captured by the mobile device camera.

FIG. 19 illustrates another process 1900 that may be performed by the boundary detection facility to identify a location of the boundary between the two field of view. Process 1900 begins at step 1910 where the facility receives multiple images captured by a camera of the mobile device over time. The mobile facility may receive the images as described with respect to step 1110 described in reference to FIG. 11 above.

Next process 1900 proceeds to step 1920 where the boundary detection facility determines an optical flow in a first segment of the received image(s). The facility may determine optical flow as described above in reference to FIG. 11. In order to determine optical flow in the first segment, the boundary detection facility may identify one or more points in a first image frame of a sequence of image frames. For example, the facility may identify an object in the first image frame. The case detection facility may then identify the same points in one or more subsequence image frames. The case detection facility may then determine a direction and magnitude of movement of the points between the first frame and the subsequent frames. For example, the facility may calculate a vector (e.g., a velocity vector) that indicates the direction and magnitude of movement of the points between the first image frame and subsequent image frames. In some embodiments, the facility may determine an optical flow in the received image(s) and identify a first segment of the received image(s) with a first optical flow. For example, the facility may determine the optical flow for all the pixels in the image and identify a first set of pixels that have the first optical flow or are within a threshold range of the first optical flow. The facility may, for example, identify a first set of pixels that have a specific direction and/or magnitude of movement across the sequence of image frames.

Next process 1900 proceeds to step 1930 where the boundary detection facility determines a different optical flow in a second segment of the received image(s). In some embodiments, the facility may determine the optical flow in the received image(s) and identify a second segment of the received image(s) having the second optical flow or within a threshold range of the second optical flow, wherein the second optical flow is different from the first optical flow. For example, the facility may identify a set of pixels that have the second optical flow or are within a threshold range of the second optical flow.

Next, process 1900 proceeds to step 1940 where the boundary detection facility identifies a boundary between the first and segments having different optical flows as a position of a split in the received image(s) of two fields of view. In some embodiments, the facility identifies a location in the received image(s) that define the boundary between the segment having the first optical flow and the segment have the second optical flow. The facility may identify the set of pixels as the position of the split in the received image(s). For example, the facility may determine a set of pixels that define the boundary between a first set of pixels having a first optical flow and a second set of pixels having a second optical flow. The facility may identify the set of pixels as the position of the image split between the two fields of view. After step 1940, process 1900 ends.

In some embodiments, the location of a boundary between the two fields of view in images received by the mobile device may be pre-determined and stored on the mobile device. For example, the boundary detection facility may store a pre-determined image split position. In some embodiments, the mobile device may use the stored split position. The position may, for example, be determined based on particular hardware and software specifications of the mobile device. For example, a position of an image split position may be determined for each of multiple different mobile device types (e.g., iPhone 8, Samsung Galaxy Note 7, etc.).

Figure 20:
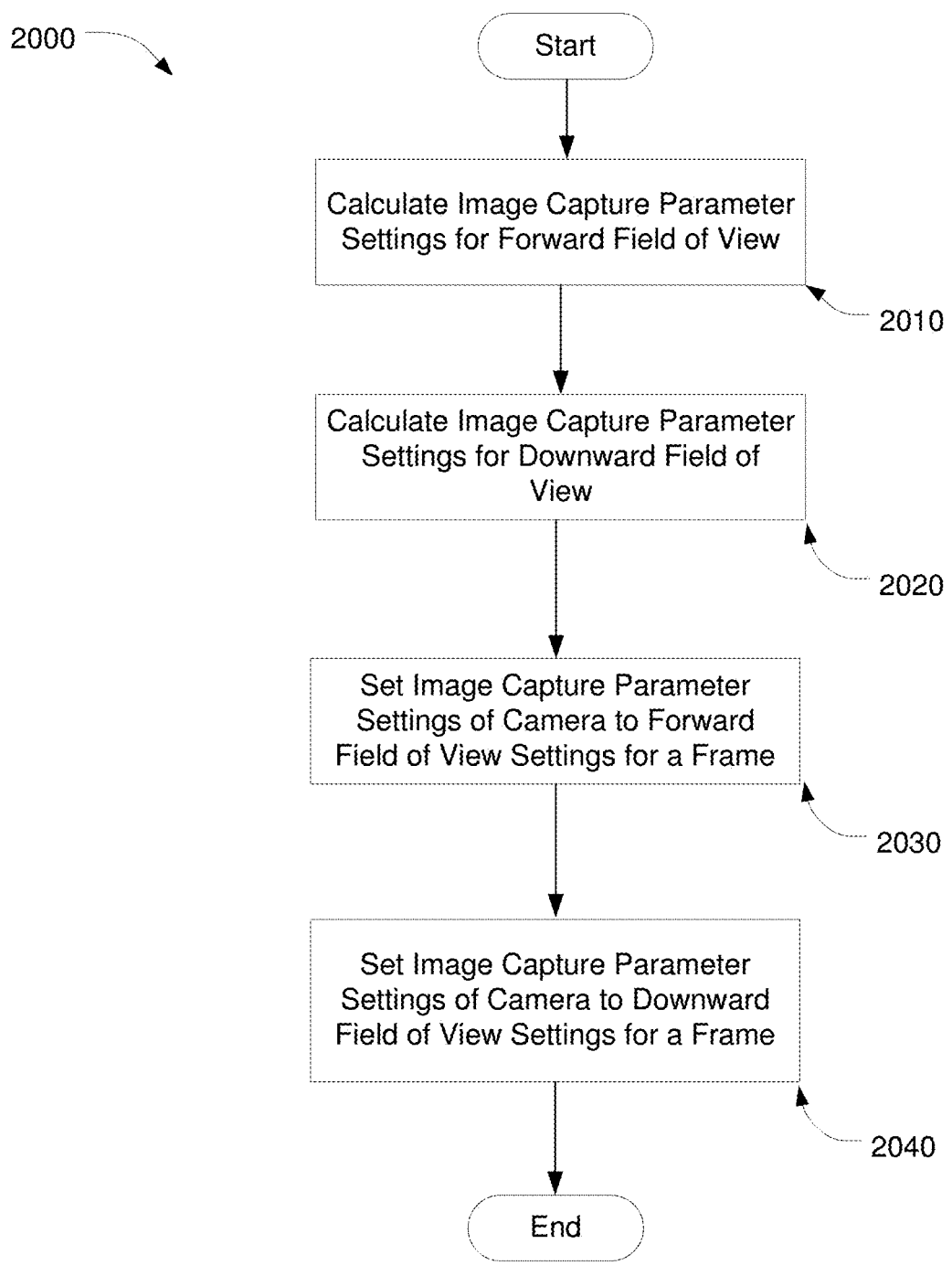
FIG. 20 is a flowchart of an example process that may be implemented in some embodiments for setting image capture settings for multiple fields of view of a mobile device camera.

As described above, in step 1030 of process 1000 described above with reference to FIG. 10, after detecting a boundary in images captured by the mobile device, according to some embodiments, a capture setting facility may determine image capture parameters. As described above, when the mobile device is placed in a case of some embodiments, a mobile device camera simultaneously views multiple fields of view. When a camera is able to view and/or capture images in multiple fields of view at once, the focus point in different fields of view may be different, or the lighting in different fields of view may be different, or circumstances between the fields of view may otherwise vary. Accordingly, the facility may set image capture parameters for each field of view differently for the mobile device to effectively perform functions associated with each field of view. FIG. 20 illustrates a process 2000 that a capture setting facility executing on a mobile device may perform to set image capture parameters (e.g., shutter speed, ISO setting, and/or aperture) differently for each of multiple fields of view of a camera of the mobile device.

Process 2000 begins at step 2010 where the facility determines image capture parameter settings for a forward field of view (e.g., field of view 107). According to some embodiments, the facility may set exposure and/or focus settings including shutter speed, ISO setting, aperture, focal length, and/or focus range. The capture setting facility may analyze image information received from the forward field of view and set settings based on the image information. In some such embodiments, known techniques for determining exposure values from analysis of image information (e.g., luminosity values) may be used. The capture setting facility may designate a point or region in the forward field of view by which to determine exposure and/or focus settings, such as by using luminosity values of that point or region. In some embodiments, the facility may use auto-exposure and/or auto-focus functionality available in the mobile device, such as in operating system or other system software of the mobile device, to determine exposure settings for the designated point/region. For example, the capture setting facility may designate a particular point/region, then trigger performance of auto-exposure and/or auto-focus functionality based on that point/region. The point/region may be, in some embodiments, a point/region within a first field of view or within a second field of view. Accordingly, in some embodiments, the facility may analyze luminosity values in a portion of an image corresponding to the downward field of view to determine the settings. For example, the facility may analyze pixel RGB values to determine the settings. The facility may use known techniques to determine settings based on the pixel values.

Next process 2000 proceeds to step 2020 where the capture setting facility determines a setting of image capture parameters for a downward field of view (e.g., field of view 105 in FIG. 1). According to some embodiments, the facility may allow a camera application of the mobile device to determine image capture parameter settings for the downward field of view. For example, the facility may use a default setting of parameters or a stock algorithm for determining the settings. Accordingly, the facility may allow the device camera to capture images from the downward field of view as the device camera would when the mobile device is not placed in the case. In some embodiments, the facility may analyze image information received from the downward field of view and set settings based on this image information. This may be done as discussed in connection with step 2010.

Next, process 2000 proceeds to step 2030 where the facility sets the image capture parameters of the camera to settings determined for the forward field of view for an image frame or for a sequence of image frames. According to some embodiments, the facility may receive a continuous sequence of image frames from the mobile device of the camera. The facility may set the image capture parameters of the camera to the determined settings for a first frame or sequence of the sequence of image frames. This may enable to the mobile device to ensure accurate image capturing of a target object in the forward field of view. For example, the mobile device may set exposure settings for the first frame to settings for reading a target bar code in the forward field of view in step 2010. The facility then allows for accurately reading of the target bar code.

Next process 2000 proceeds to step 2040 where the capture setting facility sets the image capture parameters (e.g., exposure or focus settings) to the setting determined for the downward field of view. For example, the facility may set exposure or focus parameters to values determined in step 2030. In some embodiments, the facility may set the parameters to the settings for the downward field of view for a second image frame or sequence of image frames in the received sequence of image frames. In another embodiment, the facility may set the parameters to the settings for the downward field view for the same frame or sequence that was configured for the forward field of view. The facility may then trigger capture of the image frame to capture an image of the downward field of view that is configured according to settings for the second field of view.

In some embodiments, the facility may store settings for the forward field of view once they are determined for the field of view. Subsequently, the settings may be used to process an image during capture of an image and/or scanning of a bar code without the settings needing to be calculated again, by retrieving the settings determined at one time for use in setting exposure for image capture at a subsequent time. The settings may be stored and used in such embodiments until any suitable criteria is met. For example, the settings may be used until the facility detects (e.g., via an accelerometer of the mobile device, an optical flow analysis, or otherwise) that the mobile device has moved. As another example, the settings may be used until there is a change in luminosity of the field of view that is greater than a threshold amount. Such as a change of an average luminosity value for the field of value that is more than a threshold amount. As a further example, the settings may be stored and used for a period of time. After the criteria are met, the facility may determine the exposure settings again. In some embodiments, two or more criteria may be used and may be met at a time for the settings to be determined again. In other embodiments, the settings may be calculated again when a facility determines that any one from a set of two or more criteria are met.

As mentioned above, in some embodiments a mobile device may be configured such that settings are set for an entirety of a field of view of a camera of a mobile device. Accordingly, in some such embodiments, the settings may not be set for only regions of an image captured by a camera that correspond to one field of view or another. Instead, in some embodiments, the capture setting facility may divide image frames received from the mobile device camera into two groups, with the frames interleaved in the groups, potentially interleaved one-by-one between the two groups such that an image from the first group is followed by an image from the second group, then the first group, then the second group, and so on. The two groups may correspond to two fields of view of the camera. An image from the first group may be used to set exposure and/or focus setting values for the first group of images, by using auto-exposure and auto-focus functionalities of the mobile device with a point/region designated within a portion of the image that corresponds to the first field of view. Once settings are determined for that image based on image data for the first field of data, the settings may be used for subsequent images of that group. The same may be done for an image in the second group, based on settings determined using a point/region designated within a portion of the image that corresponds to the second field of view.

Accordingly, in some embodiments, the capture setting facility may continuously alternate the settings for each image frame in a sequence of received image frames. The facility may alternate the image parameter settings for each frame between those for the forward field of view and those for the downward field of view. In another embodiment, the facility may set image capture parameter settings for both fields of view for the same frame. For example, for a given image frame, the facility may first set the image capture parameter settings to those of the forward field of view and then set the image capture parameter settings to those of the downward field of view. The facility may then separately trigger capture (e.g., save) of an image frame with the image capture parameters set for the forward field of view and of an image frame with the image capture parameters set for the downward field of view.

In other embodiments, the settings may be recalculated each time an image is to be captured for scanning of a bar code. When a bar code is to be scanned in one field of view or the other, settings may be determined for that field of view as discussed above, and the settings for that field of view may be applied to the captured image.

According to some embodiments, the capture setting facility may prioritize some image capture parameters over others. According to one embodiment, the facility may prioritize reduction of shutter speed over setting of ISO, and in some embodiments aperture may not be available for setting on the mobile device. The forward field of view may be designed for use by a user "pointing" the mobile device at a bar code. In such a case, there may be expected movement of the mobile device in the user's hand, and there may be a corresponding increased risk of blur or a ghost effect in a received image(s). As a result, the facility may prioritize reduction of shutter speed to minimize blur and/or a ghost effect and allow the mobile device to accurately read the bar code. In doing so, to compensate for a low shutter speed, the facility may set an ISO value higher, as part of striking a balance between parameters. According to some embodiments, algorithms for setting of shutter speed may be learned from analysis of many bar codes. The algorithms may use pixel intensity values to set shutter speed and other exposure settings.

As described above, some mobile devices may have multiple cameras. Each of multiple cameras of the mobile device may collect different image information. For example, a first camera may capture black and white color image information while a second camera may capture color information. According to some embodiments, the mobile device case may designate the first camera for scanning of bar codes. In these embodiments, the capture setting facility may set image capture parameter settings for each camera separately. The facility may set image capture parameters of one camera to settings associated with reading bar codes and set image capture parameters of another camera to settings associated with taking photos.

According to some embodiments, the mobile device may operate in multiple modes. As described above, the case may enable the mobile device camera to capture images from multiple fields of view. Accordingly, the mobile device may operate in a mode associated with scanning bar codes and a normal mode (e.g., for taking photos). In some embodiments, a mode determination facility may determine a scan mode of the mobile device. The facility may determine whether the mobile device is being used to scan a bar code or whether the mobile device is being used to capture images in a different manner (e.g., take a photo).

According to some embodiments, the mode determination facility may determine the scanning mode of the mobile device based on a user selection. The facility may include a user input that allows the user to set a scanning mode of the mobile device. For example, the facility may include an application that has a button or setting that can be set or selected by the user to indicate a bar code scanning mode. Accordingly, the mobile device can set image capture parameter based on the user selected scanning mode.

According to some embodiments, the mode determination facility may determine the scanning mode using sensors of the mobile device. The facility may use sensors of the mobile device to determine which image capture mode the mobile device is currently being used for. For example, the facility may use an accelerometer and/or gyroscope to determine an orientation of the mobile device. The scanning mode may be determined according to the orientation of the mobile device and the image capture parameters may be set accordingly.

According to some embodiments, the mode determination facility may determine the mode based on an application on the mobile device. A particular application may perform tasks associated with bar code scanning, and/or enabling the mobile device camera to view multiple fields of view simultaneously. The facility may trigger a bar code scanning mode in response to the application running. For example, launching the application on the mobile device may automatically result in the mobile device being configured to scan bar codes.

In some embodiments, the mode determination facility may trigger a bar code scanning mode. If the facility detects that a bar code is present in one of the fields of view, the facility may trigger a bar code scanning mode. Otherwise, the facility may trigger a separate scanning mode (e.g., for taking photos). For example, a user may point a forward field of view of the mobile device camera at a bar code. The facility may recognize a presence of a bar code in the field of view. In response, the facility may trigger a bar code scanning mode.

As described above, the capture setting facility may continuously alternate the settings for each image frame in a sequence of image frames received by the mobile device camera. In some embodiments, when the scanning facility receives an instruction to capture a bar code, the scanning facility may capture an image frame configured with the exposure settings for a field of view designated for scanning of bar codes. For example, the scanning facility may trigger capturing of an image frame that is configured with exposure settings that are set to capture an image of a barcode such that the scanning facility can accurately and efficiently read the bar code. In some embodiments, when the scanning facility receives an instruction to capture an image, the capture setting facility may dynamically determine exposure settings to capture the image. For example, the capture setting facility may designate a point in a field of view and analyze information at the point to determine exposure settings as described above in connection to FIG. 20.

Techniques operating according to the principles described herein may be implemented in any suitable manner. Included in the discussion above are sequences of steps showing the steps and acts of various apparatuses and processes that enable a mobile device to view multiple fields of view simultaneously and scan bar codes. The processing and decision blocks of the sequences above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the discussions of sequences of steps included herein do not depict the syntax or operation of any particular circuit or of any particular programming language or type of programming language. Rather, the discussions of sequences of steps illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application. Embodiments are not limited to being implemented in any specific number, division, or type of functional facilities. In some implementations, all functionality may be implemented in a single functional facility.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 2106 of FIG. 21 described below (i.e., as a portion of a computing device 2100) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Figure 21:
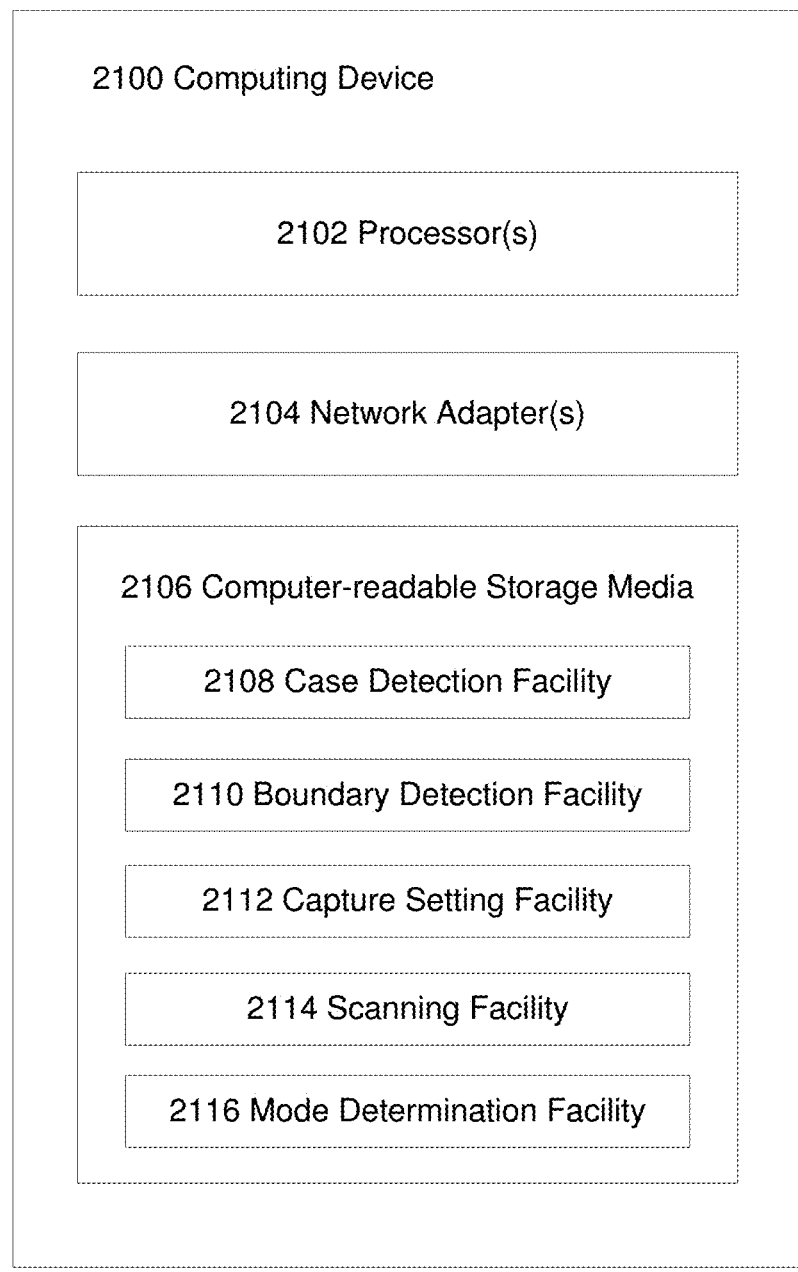
FIG. 21 illustrates one exemplary implementation of a computing device, in accordance with some embodiments.

In some, but not all, implementations in which the techniques may be embodied as computer-executable instructions, these instructions may be executed on one or more suitable computing device(s) operating in any suitable computer system, including the exemplary computer system of FIG. 21, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing devices (co-located or geographically distributed) dedicated to executing the techniques described herein, one or more Field-Programmable Gate Arrays (FPGAs) for carrying out the techniques described herein, or any other suitable system.

FIG. 21 illustrates one exemplary implementation of a computing device in the form of a computing device 2100 that may be used in a system implementing techniques described herein, although others are possible. It should be appreciated that FIG. 21 is intended neither to be a depiction of necessary components for a computing device to operate as a remote computing device in accordance with the principles described herein, nor a comprehensive depiction.

Computing device 2100 may comprise at least one processor 2102, a network adapter 2104, and computer-readable storage media 2106. Computing device 2100 may be, for example, a desktop or laptop personal computer, a personal digital assistant (PDA), a smart mobile phone, a server, a wireless access point or other networking element, or any other suitable computing device. Network adapter 2104 may be any suitable hardware and/or software to enable the computing device 2100 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 2106 may be adapted to store data to be processed and/or instructions to be executed by processor 2102. Processor 2102 enables processing of data and execution of instructions. The data and instructions may be stored on the computer-readable storage media 2106.

The data and instructions stored on computer-readable storage media 2106 may comprise computer-executable instructions implementing techniques which operate according to the principles described herein. In the example of FIG. 21, computer-readable storage media 2106 stores computer-executable instructions implementing various facilities and storing various information as described above. Computer-readable storage media 2106 may store the inputs, the outputs and the variables described above. The Computer-readable storage media 2106 may further have encoded thereon the facilities described above. The facilities may include a case detection facility 2108, a boundary detection facility 2110, a capture setting facility 2112, a scanning facility 2114, and a mode determination facility 2116.

While not illustrated in FIG. 21, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format, gestures or motions detected in images, or input detected via a touch screen.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein.

Accordingly, the foregoing description and drawings are by way of example only.

What is claimed is:

1. A case for a mobile device having a camera, the case comprising:
   a housing having a shape fitted at least in part to a shape of at least a portion of an exterior of the mobile device and arranged to receive and hold the at least the portion of the mobile device, the housing comprising:
     a back surface, the back surface corresponding to a surface of the mobile device on which the camera is disposed;
     at least one top surface;
     a first opening on the back surface;
     a second opening on at least a first one of the at least one top surface; and
     at least one optical element;
     wherein the housing is arranged such that when at least the portion of the mobile device is disposed in the housing:
       at least a first one of the at least one optical element conveys light between the second opening and the camera,
       light received by the camera at a time via the first opening defines a first field of view of the camera at the time and light received by the camera at the time via the second opening defines a second field of view of the camera at the time, and
       the first field of view and the second field of view are noncontiguous.

2. The case of claim 1, wherein a direction of the first field of view from the camera is more than 45 degrees away from a direction of the second field of view from the camera.

3. The case of claim 1, wherein the first opening allows light to reach a first portion of the camera at the time and the first optical element conveys light from the second opening to a second portion of the camera at the time, the second portion of the camera being different from the first portion of the camera.

4. The case of claim 3, wherein the second portion of the camera is a smaller portion than the first portion.

5. The system of claim 4, wherein the mobile device is a mobile phone.

6. The case of claim 1, wherein the first optical element comprises a mirror arranged to deflect light from the second opening to the camera.

7. The case of claim 1, wherein the first optical element comprises a prism arranged to deflect light from the second opening to the camera.

8. The case of claim 1, further comprising:
   a third opening on the at least one top surface; and
   at least one second optical element to convey light between a light source of the mobile device and the third opening, when at least the portion of the mobile device is disposed in the housing.

9. The case of claim 8, wherein the at least one second optical element generates an aimer light pattern projected through the third opening.

10. The case of claim 9, wherein the at least one second optical element is arranged to redirect and/or reshape light received from the light source of the mobile device to generate the aimer light pattern.

11. The case of claim 10, wherein the at least one second optical element comprises at least one lens and/or at least one prism to redirect and/or reshape the light received from the light source.

12. The case of claim 10, wherein the at least one second optical element comprises a pentaprism.

13. The case of claim 10, wherein the at least one second optical element comprises one or more reflective surfaces.

14. The case of claim 10, wherein the at least one second optical element comprises one or more anti-reflective surfaces.

15. The case of claim 10, wherein the at least one second optical element comprises a prism having a first surface with a reflective coating and a second surface with an anti-reflective coating.

16. The case of claim 9, wherein the at least one second optical element comprises one or more filters to generate the aimer light pattern of a color.

17. The case of claim 8, wherein:
   the case further comprises a fourth opening on the back surface, the fourth opening being arranged such that a first portion of light emitted by the light source at a time passes through the fourth opening without passing through the at least one second optical element; and
   the at least one second optical element conveys a second portion of the light emitted by the light source at the time passes through the at least one second optical element to the third opening.

18. The case of claim 1, wherein:
   the first field of view is a field of view in a downward direction visible from or facing the back surface; and
   the second field of view is a field of view in a forward direction visible from or facing the at least one top surface.

19. A system comprising:
   the case of claim 1; and
   a mobile device at least partially disposed in the case such that at the time light reaches the camera of the mobile device from both the first opening and the second opening.

* * * * *